(12) United States Patent
Glaser et al.

US011507933B2

(10) Patent No.: US 11,507,933 B2
(45) Date of Patent: Nov. 22, 2022

(54) CASHIER INTERFACE FOR LINKING CUSTOMERS TO VIRTUAL DATA

(71) Applicant: Grabango Co., Berkeley, CA (US)

(72) Inventors: William Glaser, Berkeley, CA (US); Scott Robertson, San Mateo, CA (US); Daniel Bennett Lythcott-Haims, Palo Alto, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 129 days.

(21) Appl. No.: 16/806,946

(22) Filed: Mar. 2, 2020

(65) Prior Publication Data

US 2020/0279240 A1 Sep. 3, 2020

Related U.S. Application Data

(60) Provisional application No. 62/812,265, filed on Mar. 1, 2019.

(51) Int. Cl.
*G06Q 20/20* (2012.01)
*G06T 19/00* (2011.01)
*G06V 20/10* (2022.01)

(52) U.S. Cl.
CPC ......... *G06Q 20/208* (2013.01); *G06Q 20/203* (2013.01); *G06T 19/006* (2013.01); *G06V 20/10* (2022.01)

(58) Field of Classification Search
CPC .............. G06Q 20/208; G06Q 20/203; G06K 9/00664; G06T 19/006

(Continued)

(56) References Cited

U.S. PATENT DOCUMENTS 5,254,853 A 10/1993 Reich
5,418,567 A 5/1995 Boers et al.
(Continued)

FOREIGN PATENT DOCUMENTS

BR 102016019151 A2 3/2018
BR 112019027120 12/2019
(Continued)

OTHER PUBLICATIONS

U.S. Appl. No. 16/218,310, filed Dec. 12, 2018, William Glaser.
(Continued)

*Primary Examiner* — Florian M Zeender
*Assistant Examiner* — Nicole Elena Bruner
(74) *Attorney, Agent, or Firm* — Alpine Patents LLC; Brian Van Osdol

(57) ABSTRACT

A system and method for applications of computer vision in linking users with virtual data that can include detecting digital interaction state of a plurality of subjects in an environment using at least one sensor-based monitoring system; detecting a contextual organization of subjects relative to an operator station; at the operator station, augmenting the user interface based on the contextual organization of subjects which comprises of at least: presenting a set of subject indicators in the user interface with the subject indicators arranged in response to contextual organization, and in response to received user interaction with at least one selected subject indicator, accessing the digital interaction state of the subject associated the at least one subject indicator.

13 Claims, 12 Drawing Sheets

(58) Field of Classification Search
USPC .......................................................... 705/23
See application file for complete search history.

(56) References Cited

U.S. PATENT DOCUMENTS

| | | |
|---|---|---|
| 5,502,564 A | 3/1996 | Ledger |
| 6,970,183 B1 | 11/2005 | Monroe |
| 6,996,460 B1 | 2/2006 | Krahnstoever et al. |
| 7,053,915 B1 | 5/2006 | Jung et al. |
| 7,195,157 B2 | 3/2007 | Swartz et al. |
| 7,225,414 B1 | 5/2007 | Sharma et al. |
| 7,227,976 B1 | 6/2007 | Jung et al. |
| 7,274,803 B1 | 9/2007 | Sharma et al. |
| 7,283,650 B1 | 10/2007 | Sharma et al. |
| 7,319,779 B1 | 1/2008 | Mummareddy et al. |
| 7,505,621 B1 | 3/2009 | Agrawal et al. |
| 7,590,261 B1 | 9/2009 | Mariano et al. |
| 7,711,155 B1 | 5/2010 | Sharma et al. |
| 7,734,070 B1 | 6/2010 | Sharma et al. |
| 7,848,548 B1 | 12/2010 | Moon et al. |
| 7,911,482 B1 | 3/2011 | Mariano et al. |
| 7,912,246 B1 | 3/2011 | Moon et al. |
| 7,921,036 B1 | 4/2011 | Sharma et al. |
| 7,930,204 B1 | 4/2011 | Sharma et al. |
| 7,957,565 B1 | 6/2011 | Sharma et al. |
| 7,974,869 B1 | 7/2011 | Sharma et al. |
| 7,987,111 B1 | 7/2011 | Sharma et al. |
| 3,009,863 A1 | 8/2011 | Sharma et al. |
| 8,010,402 B1 | 8/2011 | Sharma et al. |
| 8,027,521 B1 | 9/2011 | Moon et al. |
| 8,098,888 B1 | 1/2012 | Mummareddy et al. |
| 8,189,926 B2 | 5/2012 | Sharma et al. |
| 8,219,438 B1 | 7/2012 | Moon et al. |
| 8,254,633 B1 | 8/2012 | Moon et al. |
| 8,295,597 B1 | 10/2012 | Sharma et al. |
| 8,325,982 B1 | 12/2012 | Moon et al. |
| 8,351,647 B2 | 1/2013 | Sharma et al. |
| 8,379,937 B1 | 2/2013 | Moon et al. |
| 8,380,558 B1 | 2/2013 | Sharma et al. |
| 8,396,758 B2 | 3/2013 | Paradise et al. |
| 8,412,656 B1 | 4/2013 | Baboo et al. |
| 8,433,612 B1 | 4/2013 | Sharma et al. |
| 8,448,859 B2 | 5/2013 | Goncalves et al. |
| 8,520,906 B1 | 8/2013 | Moon et al. |
| 8,577,705 B1 | 11/2013 | Baboo et al. |
| 8,606,645 B1 * | 12/2013 | Applefeld .............. G06Q 30/02 705/26.1 |
| 8,812,344 B1 | 8/2014 | Saurabh et al. |
| 9,120,621 B1 | 9/2015 | Curlander et al. |
| 9,141,931 B2 | 9/2015 | Ackerman |
| 9,161,084 B1 | 10/2015 | Sharma et al. |
| 9,250,712 B1 | 2/2016 | Todeschini |
| 9,262,681 B1 | 2/2016 | Mishra |
| 9,270,634 B1 | 2/2016 | Gu et al. |
| 9,317,785 B1 | 4/2016 | Moon et al. |
| 9,412,099 B1 | 8/2016 | Tyree |
| 9,426,720 B2 | 8/2016 | Cohn et al. |
| 9,474,934 B1 | 10/2016 | Krueger et al. |
| 9,740,977 B1 | 8/2017 | Moon et al. |
| 9,747,497 B1 | 8/2017 | Sharma et al. |
| 9,892,438 B1 | 2/2018 | Kundu et al. |
| 9,911,290 B1 | 3/2018 | Zalewski et al. |
| 9,948,902 B1 | 4/2018 | Trundle |
| 10,055,853 B1 | 8/2018 | Fisher et al. |
| 10,062,066 B2 | 8/2018 | Cancro et al. |
| 10,083,358 B1 | 9/2018 | Shin et al. |
| 10,127,438 B1 | 11/2018 | Fisher et al. |
| 10,133,933 B1 | 11/2018 | Fisher et al. |
| 10,134,004 B1 | 11/2018 | Liberato, Jr. et al. |
| 10,198,080 B1 | 2/2019 | Worley, III et al. |
| 10,198,625 B1 | 2/2019 | Shin et al. |
| 10,217,120 B1 | 2/2019 | Shin et al. |
| 10,262,331 B1 | 4/2019 | Sharma et al. |
| 10,282,621 B2 | 5/2019 | Glaser et al. |
| 10,282,720 B1 | 5/2019 | Buibas et al. |
| 10,282,852 B1 * | 5/2019 | Buibas .................... G06T 7/277 |
| 10,296,936 B1 | 5/2019 | Saurabh et al. |
| 10,339,595 B2 | 7/2019 | Glaser et al. |
| 10,347,009 B1 | 7/2019 | Terven et al. |
| 10,354,262 B1 | 7/2019 | Hershey et al. |
| 10,380,814 B1 | 8/2019 | Mathiesen et al. |
| 10,387,896 B1 | 8/2019 | Hershey et al. |
| 10,474,858 B2 | 11/2019 | Davis et al. |
| 10,740,742 B2 | 8/2020 | Glaser et al. |
| 10,832,311 B2 | 11/2020 | Chomley et al. |
| 2001/0010541 A1 | 8/2001 | Fernandez et al. |
| 2002/0122559 A1 | 9/2002 | Fay et al. |
| 2003/0210340 A1 | 11/2003 | Romanowich |
| 2003/0216969 A1 | 11/2003 | Bauer et al. |
| 2004/0201754 A1 | 10/2004 | McAlister |
| 2004/0260513 A1 | 12/2004 | Fitzpatrick et al. |
| 2005/0096997 A1 | 5/2005 | Jain et al. |
| 2005/0189411 A1 | 9/2005 | Ostrowski et al. |
| 2006/0032915 A1 | 2/2006 | Schwartz |
| 2006/0147087 A1 | 7/2006 | Goncalves et al. |
| 2007/0091177 A1 | 4/2007 | West et al. |
| 2007/0146873 A1 | 6/2007 | Ortyn et al. |
| 2007/0242300 A1 | 10/2007 | Inai |
| 2007/0284440 A1 | 12/2007 | Birmingham et al. |
| 2008/0226129 A1 | 9/2008 | Kundu et al. |
| 2008/0228585 A1 | 9/2008 | Duri et al. |
| 2009/0195648 A1 | 8/2009 | Thomas et al. |
| 2010/0020173 A1 | 1/2010 | Marquart et al. |
| 2010/0255902 A1 | 10/2010 | Goldstein et al. |
| 2010/0280956 A1 | 11/2010 | Chutorash et al. |
| 2010/0295946 A1 | 11/2010 | Reed et al. |
| 2011/0122231 A1 | 5/2011 | Fujieda et al. |
| 2011/0215147 A1 | 9/2011 | Goncalves |
| 2012/0019168 A1 | 1/2012 | Noda et al. |
| 2012/0027297 A1 | 2/2012 | Feris et al. |
| 2012/0173351 A1 | 7/2012 | Hanson et al. |
| 2013/0103537 A1 | 4/2013 | Hewett |
| 2013/0147963 A1 | 6/2013 | Henninger et al. |
| 2013/0177201 A1 | 7/2013 | Fisher |
| 2013/0215116 A1 | 8/2013 | Siddique et al. |
| 2013/0218721 A1 * | 8/2013 | Borhan ................ G06Q 20/322 705/26.41 |
| 2013/0223673 A1 | 8/2013 | Davis et al. |
| 2013/0262269 A1 | 10/2013 | O'Leary |
| 2013/0284806 A1 | 10/2013 | Margalit |
| 2013/0290557 A1 | 10/2013 | Baratz |
| 2013/0317300 A1 | 11/2013 | Berci et al. |
| 2013/0335571 A1 | 12/2013 | Libal |
| 2013/0342688 A1 | 12/2013 | Siu |
| 2014/0082519 A1 | 3/2014 | Wang et al. |
| 2014/0082610 A1 | 3/2014 | Wang et al. |
| 2014/0129688 A1 | 5/2014 | Asenjo et al. |
| 2014/0188601 A1 | 7/2014 | Buset et al. |
| 2014/0214564 A1 | 7/2014 | Argue et al. |
| 2014/0245160 A1 | 8/2014 | Bauer et al. |
| 2014/0263631 A1 | 9/2014 | Muniz |
| 2014/0265880 A1 | 9/2014 | Taipale et al. |
| 2014/0272855 A1 | 9/2014 | Maser et al. |
| 2014/0279191 A1 | 9/2014 | Agarwal et al. |
| 2014/0285660 A1 | 9/2014 | Jamtgaard et al. |
| 2014/0297487 A1 | 10/2014 | Bashkin |
| 2014/0330408 A1 | 11/2014 | Rolley |
| 2014/0363059 A1 | 12/2014 | Hurewitz |
| 2014/0365334 A1 | 12/2014 | Hurewitz |
| 2014/0372957 A1 | 12/2014 | Keane et al. |
| 2015/0012396 A1 | 1/2015 | Puerini et al. |
| 2015/0019391 A1 | 1/2015 | Kumar et al. |
| 2015/0025967 A1 * | 1/2015 | Ellison ............... G06Q 30/0261 705/14.53 |
| 2015/0029339 A1 | 1/2015 | Kobres et al. |
| 2015/0039458 A1 | 2/2015 | Reid |
| 2015/0046213 A1 | 2/2015 | Doreswamy et al. |
| 2015/0077787 A1 | 3/2015 | Nishimura et al. |
| 2015/0077797 A1 | 3/2015 | Kurokawa |
| 2015/0088694 A1 | 3/2015 | Ackerman |
| 2015/0095189 A1 | 4/2015 | Dharssi et al. |
| 2015/0097961 A1 | 4/2015 | Ure et al. |
| 2015/0109451 A1 | 4/2015 | Dhankhar |
| 2015/0124973 A1 | 5/2015 | Arteaga et al. |

(56) References Cited

U.S. PATENT DOCUMENTS

| | | |
|---|---|---|
| 2015/0133190 A1 | 5/2015 | Fisher et al. |
| 2015/0138383 A1 | 5/2015 | Kelley et al. |
| 2015/0154973 A1 | 6/2015 | McKenna et al. |
| 2015/0156332 A1 | 6/2015 | Kandregula |
| 2015/0163412 A1 | 6/2015 | Holley et al. |
| 2015/0227890 A1 | 8/2015 | Bednarek et al. |
| 2015/0244992 A1 | 8/2015 | Buehler |
| 2015/0310601 A1 | 10/2015 | Rodriguez et al. |
| 2015/0327045 A1 | 11/2015 | Chang et al. |
| 2015/0373509 A1 | 12/2015 | Wang et al. |
| 2016/0012379 A1 | 1/2016 | Iwai |
| 2016/0019514 A1 | 1/2016 | Landers et al. |
| 2016/0027262 A1 | 1/2016 | Skotty et al. |
| 2016/0037135 A1 | 2/2016 | McSheffrey et al. |
| 2016/0063821 A1 | 3/2016 | MacIntosh et al. |
| 2016/0100086 A1 | 4/2016 | Chien |
| 2016/0110791 A1 | 4/2016 | Herring et al. |
| 2016/0112608 A1 | 4/2016 | Elensi et al. |
| 2016/0132854 A1 | 5/2016 | Singh |
| 2016/0173827 A1 | 6/2016 | Dannan et al. |
| 2016/0217388 A1 | 7/2016 | Okanohara et al. |
| 2016/0224856 A1 | 8/2016 | Park et al. |
| 2016/0242252 A1 | 8/2016 | Lim et al. |
| 2016/0254864 A1 | 9/2016 | Mueller et al. |
| 2016/0270191 A1 | 9/2016 | Ludwig, Jr. et al. |
| 2016/0282039 A1 | 9/2016 | Motukuri et al. |
| 2016/0289964 A1 | 10/2016 | Engberg |
| 2016/0321506 A1 | 11/2016 | Fridental et al. |
| 2016/0345414 A1 | 11/2016 | Nolan et al. |
| 2016/0358312 A1 | 12/2016 | Kolb et al. |
| 2017/0030766 A1 | 2/2017 | Hendrick |
| 2017/0032182 A1 | 2/2017 | Motukuri et al. |
| 2017/0039613 A1 | 2/2017 | Kaehler et al. |
| 2017/0053171 A1 | 2/2017 | Buehler |
| 2017/0108236 A1 | 4/2017 | Guan et al. |
| 2017/0123030 A1 | 5/2017 | Hengerer et al. |
| 2017/0131781 A1 | 5/2017 | Buban |
| 2017/0161703 A1 | 6/2017 | Dodia |
| 2017/0169440 A1 | 6/2017 | Dey et al. |
| 2017/0178352 A1 | 6/2017 | Harmsen et al. |
| 2017/0188013 A1 | 6/2017 | Presler |
| 2017/0216667 A1 | 8/2017 | Garvey et al. |
| 2017/0249491 A1 | 8/2017 | MacIntosh et al. |
| 2017/0278175 A1 | 9/2017 | Park et al. |
| 2017/0316656 A1 | 11/2017 | Chaubard et al. |
| 2017/0323376 A1 | 11/2017 | Glaser et al. |
| 2017/0332956 A1 | 11/2017 | Bigolin et al. |
| 2018/0005044 A1 | 1/2018 | Olson |
| 2018/0012072 A1 | 1/2018 | Glaser et al. |
| 2018/0012080 A1 | 1/2018 | Glaser et al. |
| 2018/0088900 A1 | 3/2018 | Glaser et al. |
| 2018/0107968 A1 | 4/2018 | Wu et al. |
| 2018/0189763 A1 | 7/2018 | Olmstead et al. |
| 2018/0218562 A1 | 8/2018 | Conway |
| 2018/0232796 A1 | 8/2018 | Glaser et al. |
| 2018/0240180 A1 | 8/2018 | Glaser et al. |
| 2018/0245736 A1 | 8/2018 | Patel |
| 2018/0300553 A1 | 10/2018 | Khosla et al. |
| 2018/0322209 A1 | 11/2018 | Jin et al. |
| 2018/0332235 A1 | 11/2018 | Glaser |
| 2018/0332236 A1 | 11/2018 | Glaser et al. |
| 2018/0373928 A1 | 12/2018 | Glaser et al. |
| 2019/0005479 A1 | 1/2019 | Glaser et al. |
| 2019/0028643 A1 | 1/2019 | Oryoji |
| 2019/0043003 A1 | 2/2019 | Fisher et al. |
| 2019/0054347 A1 | 2/2019 | Saigh et al. |
| 2019/0079591 A1 | 3/2019 | Glaser et al. |
| 2019/0114488 A1 | 4/2019 | Glazer et al. |
| 2019/0116322 A1 | 4/2019 | Holzer et al. |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0205933 A1 | 7/2019 | Glaser et al. |
| 2019/0244161 A1 | 8/2019 | Abhishek et al. |
| 2019/0333039 A1 | 10/2019 | Glaser et al. |
| 2020/0066040 A1* | 2/2020 | Unnerstall ............ G06T 19/006 |
| 2020/0079412 A1 | 3/2020 | Ramanathan et al. |
| 2020/0134590 A1 | 4/2020 | Glaser et al. |
| 2020/0160670 A1 | 5/2020 | Zalewski et al. |
| 2020/0226523 A1* | 7/2020 | Xu ..................... G06K 9/00369 |
| 2020/0265494 A1 | 8/2020 | Glaser et al. |
| 2020/0394636 A1 | 12/2020 | Glaser et al. |

FOREIGN PATENT DOCUMENTS

| | | |
|---|---|---|
| JP | 2012008746 A | 1/2012 |
| WO | 2016210354 A1 | 12/2016 |
| WO | 2017196822 A1 | 11/2017 |
| WO | 2018237210 A1 | 12/2018 |
| WO | 2019032304 A1 | 2/2019 |

OTHER PUBLICATIONS

U.S. Appl. No. 16/911,311, filed Jun. 24, 2020, William Glaser.

Elizabeth Weise: "How Amazon's line-less grocery services might really work", USATODAY, Dec. 8, 2016 (Dec.8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020] the whole document.

Cao, Jing, "An End to the Checkout Line?", Valley News [White River Junction, VT], Dec. 11, 2016 (Year: 2016).

Zimmerman, Thomas G., Tracking Shopping Carts Using Cameras Viewing Ceiling-Mounted Retro-Reflective Bar Codes, Proceedings of the Fourth IEEE International Conference on Computer Vision Systems (ICVS 2006) (Year: 2006).

* cited by examiner

Customer Servie Rep at time t1
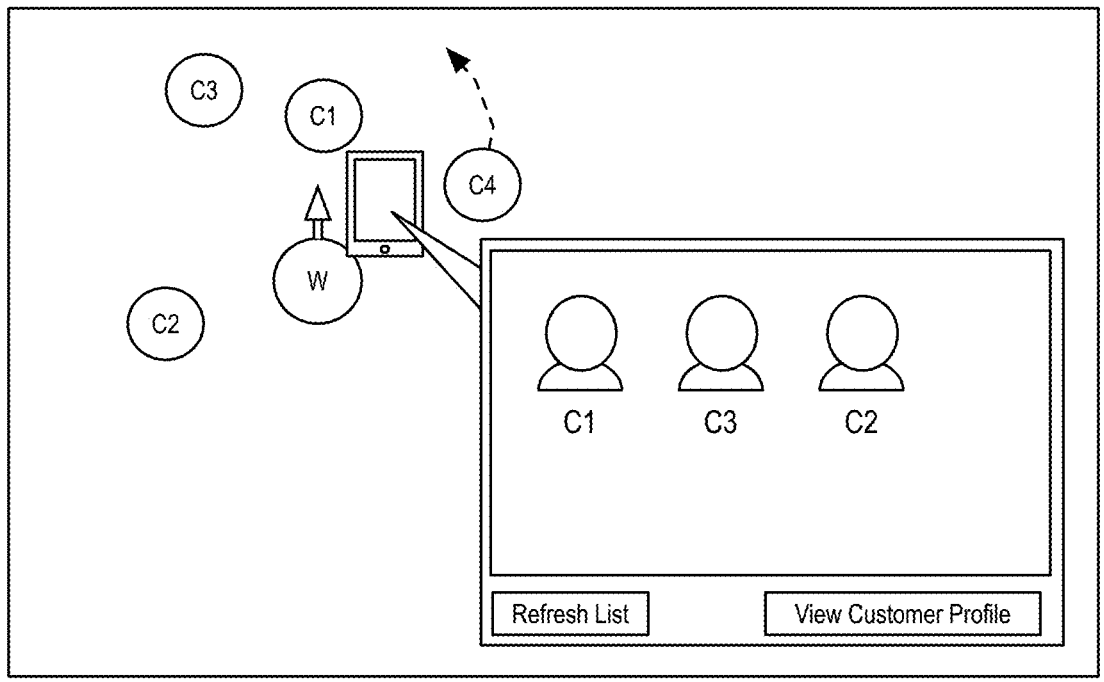
Customer Servie Rep at time t2
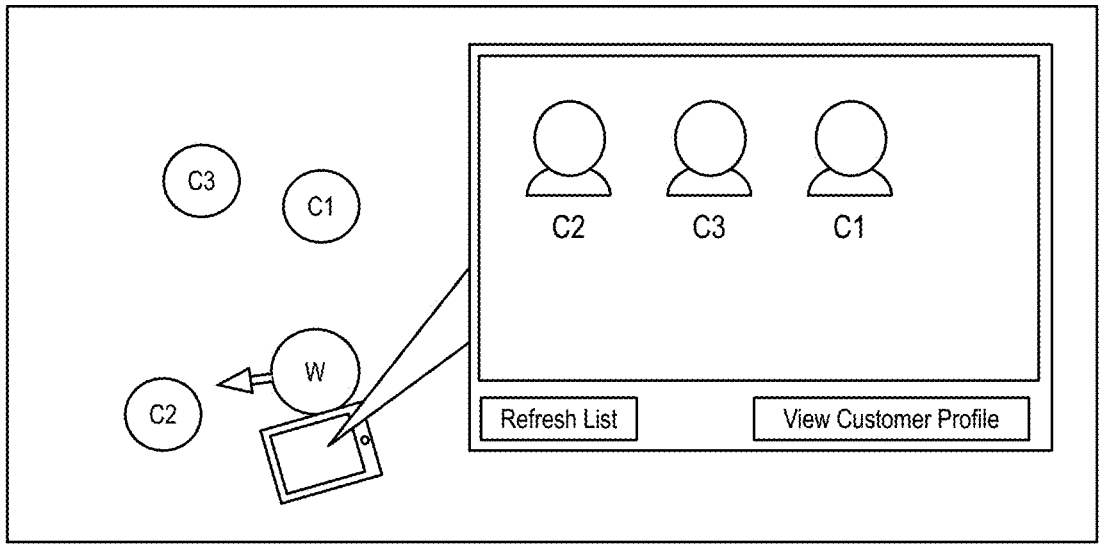
FIGURE 6

Detecting digital interaction state data of a plurality of subjects in an environment S110

Detecting a contextual organization of subjects relative to an operator station S120

At a computing device, augmenting a user interface based on the contextual organization of subjects S130

Presenting subject indicators in the user interface with the subject indicators arranged in response to contextual organization S132

In response to user interaction with a subject indicator, accessing the digital interaction state data of a subject associated with the subject indicator S134.

FIGURE 9

Detecting user-associated data of a plurality of subjects in an environment S210;

Detecting a contextual organization of subjects relative to an operator station S220

At a computing device of the operator station, augmenting a user interface based on the contextual organization of subjects S230

Presenting subject indicators in the user interface with the subject indicators arranged in response to contextual organization S232

In response to user interaction with a subject indicator, accessing the user-assocaited data of a subject associated with the subject indicator S234

FIGURE 10

Tracking checkout list status of a plurality of shoppers S310

Across a plurality of POS checkout stations, detecting a contextual organization of at least a subset of shoppers relative to each POS checkout station S320

At the POS checkout station, presenting shopper-associated UI elements in a UI of the POS checkout station, where the UI elements are organized by the contextual organization S332

Upon detecting selection of a shopper associated UI element, selecting a checkout list associated with the shopper for checkout processing S334.

FIGURE 11

CASHIER INTERFACE FOR LINKING CUSTOMERS TO VIRTUAL DATA

CROSS-REFERENCE TO RELATED APPLICATIONS

This application claims the benefit of U.S. Provisional Application No. 62/812,265, filed on 1 Mar. 2019, which is incorporated in its entirety by this reference.

TECHNICAL FIELD

This invention relates generally to the field of customer service technology, and more specifically to a new and useful system and method for applications of computer vision for linking users with virtual data.

BACKGROUND

There is a growing interest in building digital interaction experiences in physical retail spaces that leverage new forms of sensor-based monitoring. At times these sensor-based monitoring systems are used to augment existing forms of interactions. In other cases, the sensor-based monitoring systems are used to facilitate completely new forms of experiences and interactions for users. In particular, computer vision is beginning to be used, sometimes along with other forms of digital sensing, to provide automated checkout. Many such systems are limited however. In particular many such systems are not compatible with existing checkout systems. As such, the existing infrastructure of established retailers is largely not compatible with these systems. Furthermore, there are no existing solutions on how an administrator or worker can interact with such systems to perform interactions like review the status of a user with sensed information. Thus, there is a need in the customer service technology field to create a new and useful system and method for applications of computer vision for linking users with virtual data. This invention provides such a new and useful system and method.

BRIEF DESCRIPTION OF THE FIGURES

FIG. 6 is a schematic representation of an exemplary scenario of an operator servicing customers with no pre-defined line, which illustrates changes in a subject management user interface based on orientation of an operator relative to customers;

FIG. 9 is a flowchart representation of a method;

FIG. 10 is a flowchart representation of an alternative variation of the method;

FIG. 11 is a flowchart representation of a method applied to automated checkout.

DESCRIPTION OF THE EMBODIMENTS

Figure 1:
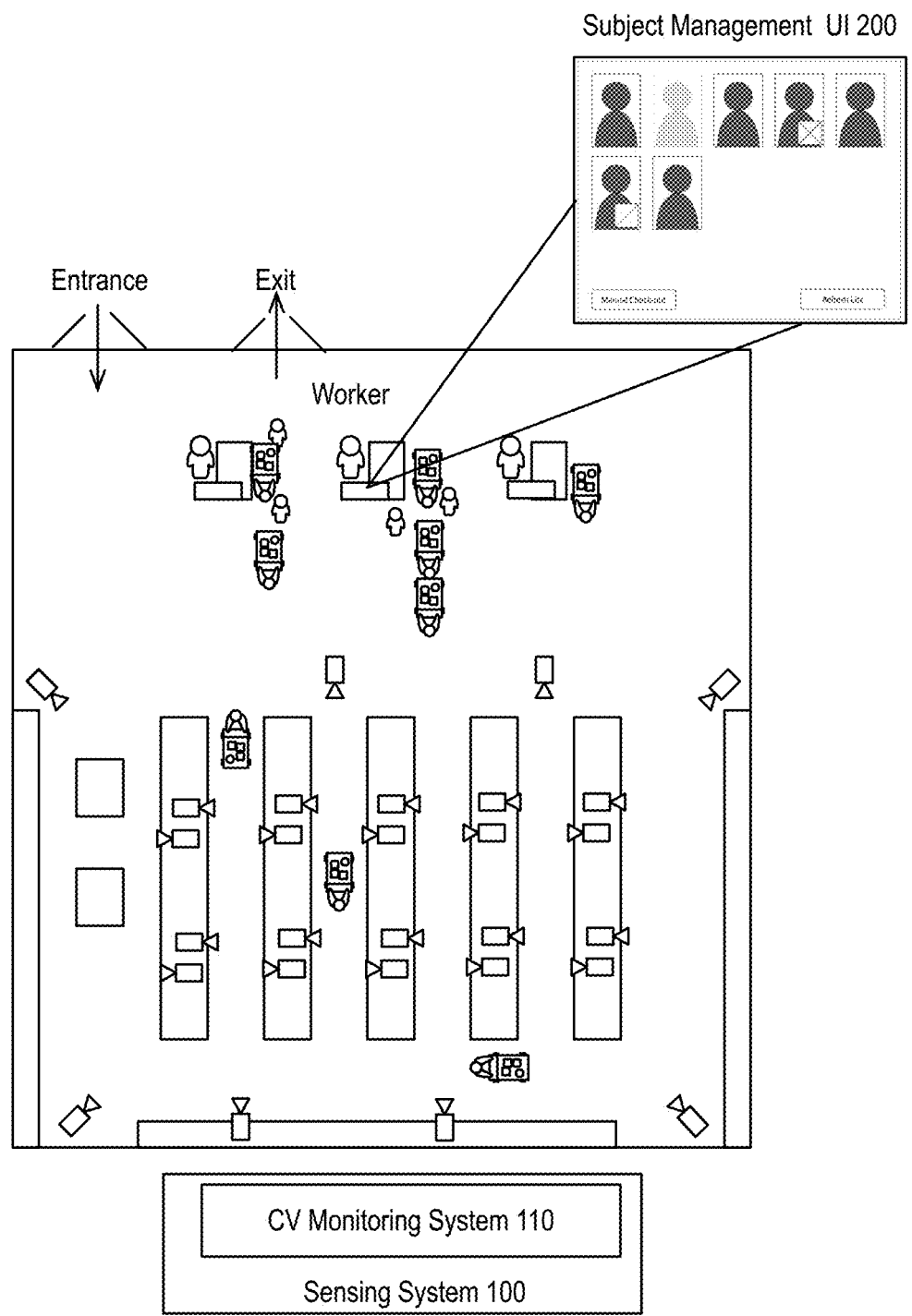
FIG. 1 is a schematic representation of a system of a preferred embodiment.

The following description of the embodiments of the invention is not intended to limit the invention to these embodiments but rather to enable a person skilled in the art to make and use this invention.

1. Overview

A system and method for applying computer vision (CV) for linking users with virtual data of a preferred embodiment functions to leverage CV monitoring in facilitating digital interactions with customers from physical computing device user interface. The system and method preferably enables a convenient user interface through which digital information and/or records associated with a person can be easily accessed by another user through a computing device. In particular, the system and method may have utility in enabling a cashier user interface on a computing device to link customers and other types of users with virtual data.

In one exemplary implementation, the system and method enables a subject management user interface to intelligently present subject indicators (e.g., user icons) that are arranged based on CV-based analysis on the position, orientation, attention, and organization of subjects in the environment relative to the computing device of the subject management user interface. Alternative types of user interfaces could similarly be presented such as rendering a live or recent image of a line and making the people in the image selectable items of a user interface, where selecting the people accesses some person associated state information. As the user interface is intelligently customized to the context and perspective of the operator of the computing device, an operator may more easily access the digital information linked (through CV monitoring and/or other forms sensor-based monitoring) to the users in proximity to the operator. On selecting one of the subject indicators, the operator may access the digital information either by viewing digital information of the user associated with the subject indicator and/or updating, adding, or deleting information of a data record associated with the user.

The system and method enables a novel and new capability for user-operated computing devices to simplify how digital information of a modeled environment can be accessed. In a sense, the system and method can coordinate subject data tracking, subject relationship modeling from an operator perspective, and subject data synchronization with a device of the operator.

For subject data tracking, a sensor-based monitoring system, such as a CV monitoring system, generates or otherwise establishes an association between a subject and at least one piece of subject data (e.g., a user profile, subject associated information or labeling, etc.) and then tracks that subject within an environment.

Subject relationship modeling can use the same or different sensor-based monitoring system to interpret the contextual relationship of a particular device (or user) relative to a set of subjects in the environment. This modeling may be used to present an interface through which some operator of a device can more easily interact with the subject data. For example, a menu of selectable subject indicators can be presented in a way that prioritizes presentation of the subject indicators based on a modeled point of view of the device that is presenting the menu user interface.

Subject data synchronization, preferably allows actions taken at an operator device to be applied to subject data. Subject data synchronization can enable an operator to access and interact with the subject data detected with the monitoring system. This may involve reading and using subject data and/or adding, updating, deleting, or otherwise editing subject data.

Figure 2:
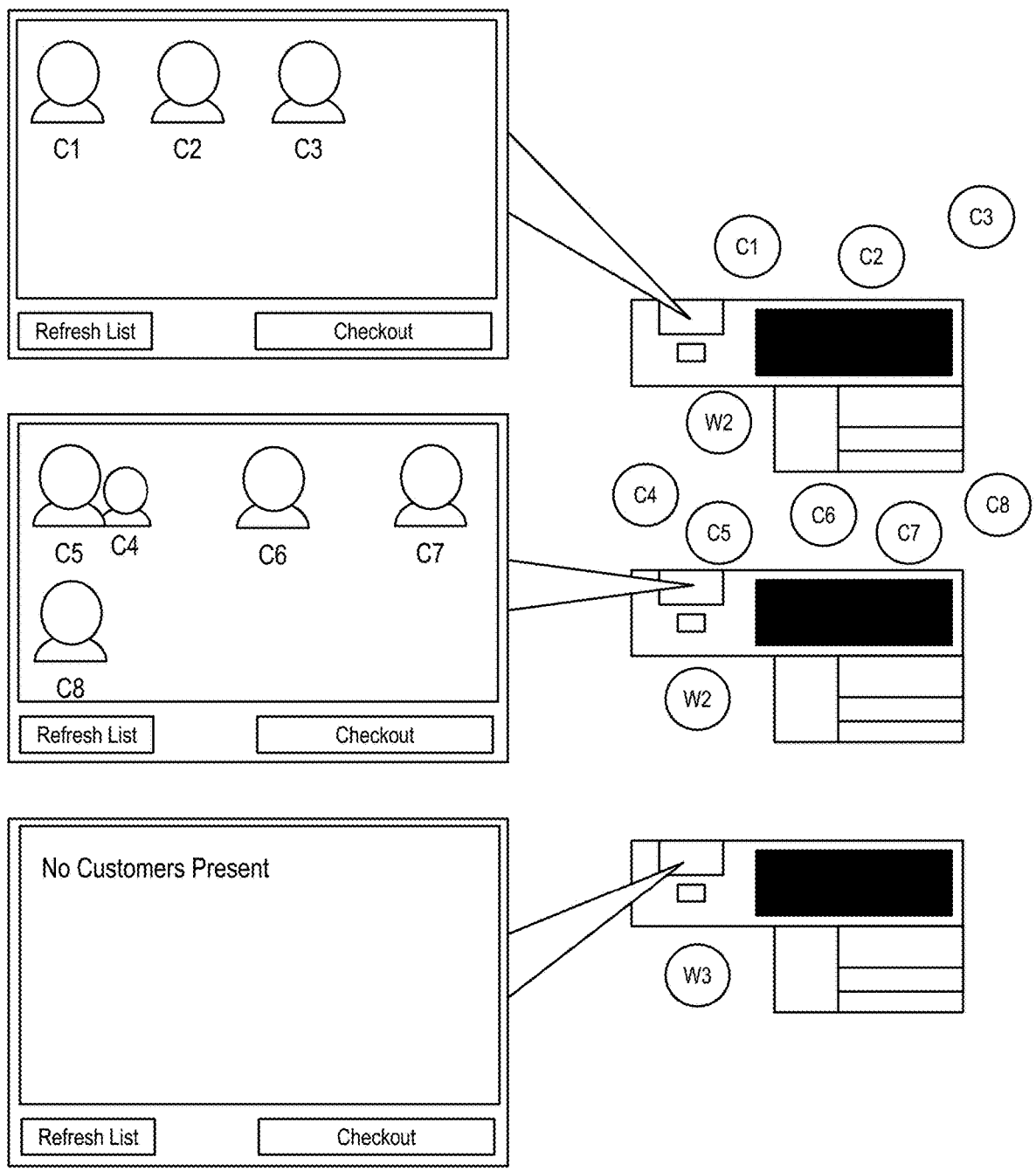
FIG. 2 is a schematic representation of an exemplary scenario of the system and method applied across multiple operator stations.

Additionally, the subject data tracking, subject relationship modeling, and subject data synchronization may be performed and managed across multiple subjects and operators in an environment. In a retail setting, the system and method can be implemented across multiple customers and workers operating POS systems that using the capabilities of the system and method in parallel as shown in FIG. 2.

This coordinated sensing, modeling, and data synchronization and communication can be particularly useful in situations where ambient computing is sensing and modeling interaction state of one or more subjects in an environment. The system and method may be applied and implemented for a variety of applications.

In one preferred implementation, the system and method are used in combination with a monitoring system used for automated checkout such as checkout-free shopping and/or assisted checkout. Herein, automated checkout can include fully automated and partially automated variations and is primarily characterized by a system or method that generates or maintains a checkout list (i.e., a virtual cart) during the shopping process of a user or users, with the objective of knowing the possessed or selected items for billing. The checkout list can be used in executing a checkout process to charge a customer for the selected items. The checkout process can occur when a customer is in the process of leaving a store. The system and method can be used so that a checkout list can be processed at a POS system, which may be the standard checkout process in the environment, a checkout option for customers without a connected checkout-free application or account, customers wanting to pay with cash or other payment options, and for any suitable reason.

In the context of the system and method, checkout may be processed in part through interactions with a cashier-operated device such as a POS system. The checkout process could alternatively occur when a customer is in the process of leaving a store or when any suitable condition for completing a checkout process is satisfied such as when a customer selects a checkout option within an application.

A checkout list may be maintained and tracked during a shopping experience through use of one or more monitoring systems. A checkout list (alternatively referred to as a checkout list) is a digitally stored data record or records modeling contents of a virtual cart (or what items are to be purchased). Any suitable number of databases and records may be used in representing item contents, item information (price, count, discounts, etc.) for items of a checkout list, and/or other information of the checkout list. In performing an automated checkout process, the system and method can charge a customer for the total of a shopping cart and/or alternatively automatically present the total transaction for customer completion. This may include entering the contents of a checkout list into a POS system for payment and/or supplying of payment information for checkout processing.

A checkout list is preferably associated with a subject. May alternatively be associated with multiple subjects if multiple subjects are detected or otherwise specified as a group collaboratively building a shared checkout list Automated checkout is used herein to describe a variety of types of sensor-assisted forms of checkout. In one variation, automated checkout is facilitated through image analysis using video cameras and more specifically using a CV monitoring system. Other variations of automated checkout can use additional or alternative forms of sensor-based monitoring such as using sensor-enabled shelves, smart carts, RF ID tracking or smart infrastructure. Automated checkout in some variations may also include user-assisted forms of checkout such as where a customer uses an application operable on a personal computing device (e.g., a smart phone) to perform some form of pre-scanning of items.

A checkout list may be generated in part or whole for a customer. In some variations, the checkout list can be synchronized with (or otherwise transmitted to) a point of sale (POS) system manned by a worker so that at least a subset of items can be automatically entered into the POS system thereby alleviating manual entry of the items. The system and method may be used in exposing cashier control over when and how a checkout list of a customer is processed by a POS system. The system and method may additionally or alternatively be used for providing customer care solutions, adding service counter items, and/or performing other operations.

Figure 3:
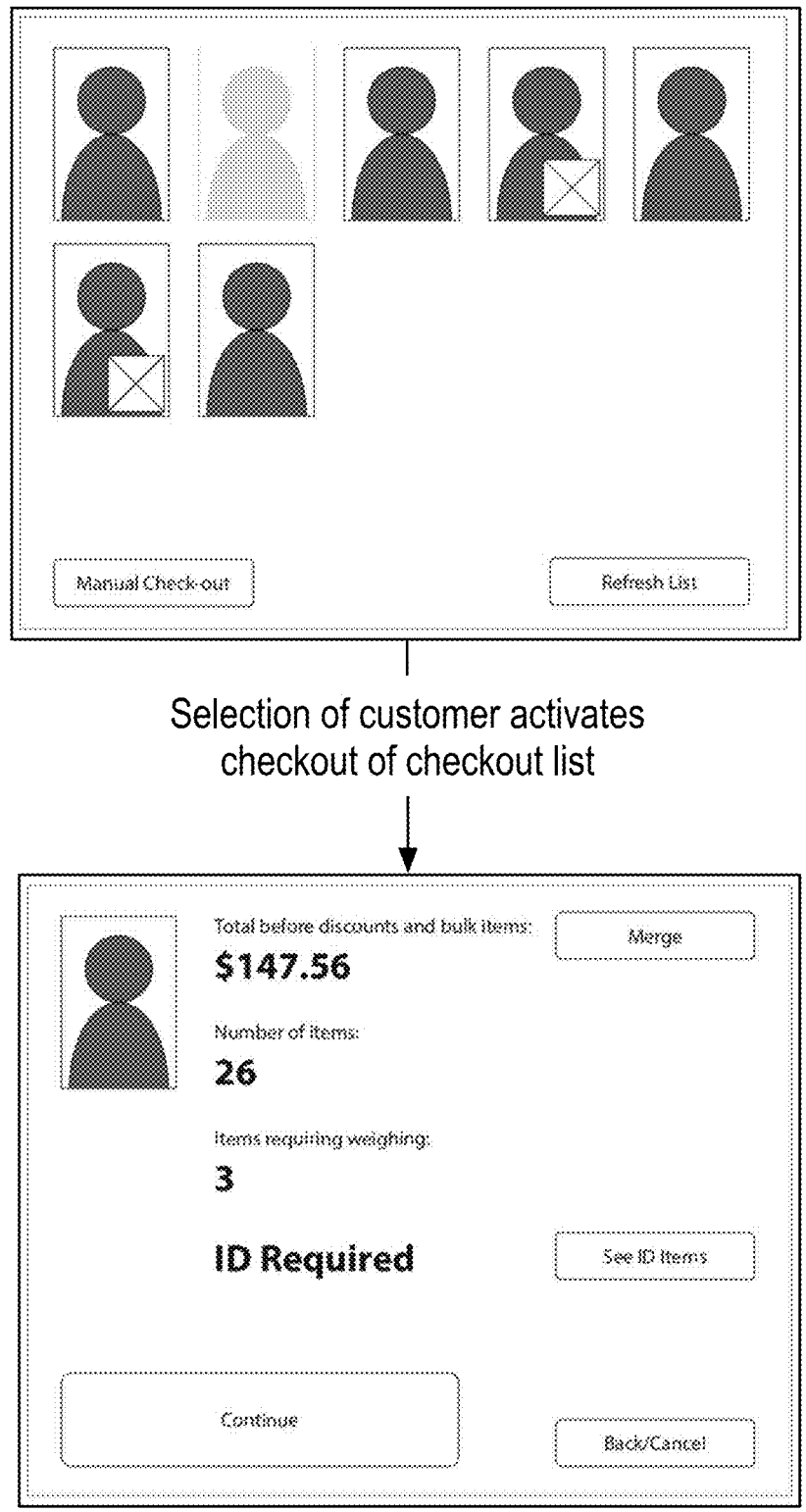
FIG. 3 is a schematic representation of an exemplary user flow for automated checkout.
Figure 4:
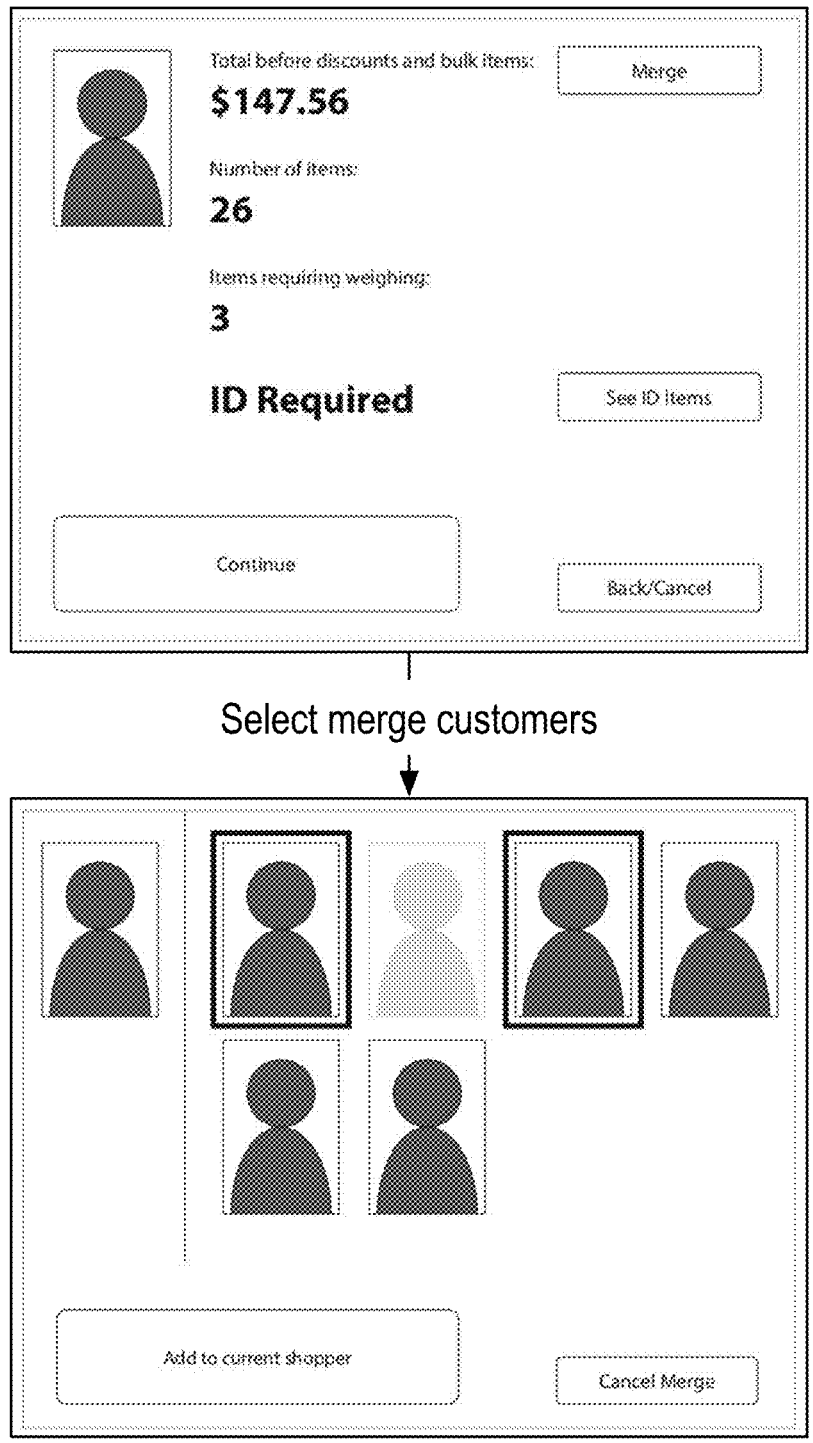
FIG. 4 is a schematic representation of an exemplary user flow for merging subjects during automated checkout.

As an exemplary implementation, the system and method may be used within a POS system in a retail environment with an automated checkout system. A CV-based monitoring system and/or other sensor-based monitoring system may be used to contextually present user icons for various customers within the POS system as shown in FIG. 3. This is preferably used so that a worker operating the POS system can have a menu of nearby customers intelligently presented within an application of the POS system. The customers can be presented with visual representation of the customers and ordered in a sensible manner (e.g., an approximation of line order) so that it is easy for a worker to select a customer for checkout. For example, the customers next in line would generally be presented first in a list of other customers in line. The system and method in this use case may additionally enable an intuitive interface for "merging" checkout lists for grouping customers for a single checkout process as shown in FIG. 4. An operator of the POS system could select one of the customers for checkout processing from a user interface customized to their particular perspective and the checkout list associated with that customer (or customers shopping together) can be processed for checkout.

As another alternative implementation, the system and method may be used to more easily update and edit the subject data associated with a subject. Similar to above, a CV-based monitoring system and/or other sensor-based monitoring system may be used to contextually present user icons for various customers within the POS system as shown in FIG. 3. A worker could then use this contextual user interface to select a customer and then supply additional information. In a grocery store setting, this may be used at a deli, fish, butcher, or bakery counter, where service counter items (which may be packaged and priced at the counter) are sold. The worker could prepare one or more service counter items for a customer, select the appropriate customer from a contextually generated user interface, and then enter the service counter items. The service counter items may then be added to a checkout list of the customer stored by an automated checkout system. This serves as an example of information being added to the subject data.

As another alternative implementation, the system and method may be used for a customer care system. A worker could similarly be presented with an array of graphical representations of customers (e.g., icons in the form of customer profile photos or in-store image captures) where the graphical representations are organized in a contextual manner based on visual interpretation of the relative position of the worker and customers in the store. In this way, a worker could quickly and seamlessly access a user profile for providing various forms of customer service. For example, a user may enter their customer care request through an app or some other computing device. A monitoring system could detect that the user is in the store and establish an association between the customer care request and the CV detected user. When a worker approaches the customer, the worker could see through a customer care app of the system and method that the customer had submitted the customer care request and the associated information (e.g., information about their problem or help request). In a crowded environment, the system and method may even help customize the contextual presentation of subject indicators based on the orientation and/or attention of an operator device and/or the operator as shown in FIG. 6. For example, the customer that the worker is facing and closest too may be presented first in the list of possible customers.

The system and method in one implementation may be able to facilitate a customer service tool to help with sales, customer appointments, customer questions, and the like. In the case of an environment with automated checkout, the system and method could be used so that a worker could easily access the checkout list information of a customer to assist a customer anywhere in the environment. This may be done in addition to or as an alternative to facilitating the checkout process within an application of the POS system.

The system and method can be particularly applicable for facilitating individualized/personalized digital experiences in group-based computing environments. Group-based computing environments as used herein are used to characterize a new form of computing where a monitoring system tracks individual state of multiple users in an environment.

The system and method are primarily described herein as it could be used along with systems for automated checkout, but the system and method are not limited such use cases. The system and method have particular applicability in the area of automated checkout as it provides a new mechanism through which such an automated checkout system can be integrated with a POS system used by a cashier. This could additionally be used for self-service checkout kiosks where a user with a tracked checkout list could complete a transaction at a self-service kiosk.

Herein, users that have tracked digital interaction information, such as customers in a store, are described primarily described herein as subjects. In examples of retail settings, the term customers may be used. Users that interact with the user interface are described herein as operators. Operators in a retail environment may be workers, and, in examples of retail settings, the term worker is sometimes used herein. In some cases, an operator could also be a subject such as when the system and method is used with a self-help kiosk.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method can increase efficiency by which workers serve customers. The system and method provide a convenient user interface for accessing customer information. Through this interface, users can better interact with the information generated and managed by a monitoring system. The system and method can avoid the clumsy process of gathering information from a user so that a digital record by searched for and found.

As another benefit, the system and method may make access to user data more secure and private by limiting access to operator devices where it contextually makes sense. For example, a worker could be prevented from viewing any customer's checkout list except for those that queue in the worker's specific lane.

As another potential benefit, the system and method provide an interface that can conveniently leverage the intuition of a human. In the case of a POS system of an automated checkout system, a worker can use their human intuition of who is next in line and who is checking out as a group to select customers for checkout. For example, the customers will generally form a line in front of the worker. However, the line will often deviate from an ideal line that can be easily interpreted from a CV monitoring system. As one exemplary scenario, a child may wander up and down the line away from a parent, but a worker observing social interactions would be able to interpret the situation to understand the child (and the products held by them) should be merged with the products of the parent. The system and method can easily handle this situation. As another exemplary scenario, groups of adults (e.g., couples, friends, etc.) could be easily segmented by a human worker for separating or grouping purchases by selectively asking simple questions (e.g., "Are you two paying together?"). The system and method can provide a convenient and efficient technology-based solution for managing digitally stored user data like checkout lists. The system and method facilitates a user interface that maintains this valuable form of human input.

As a related potential benefit, the system and method can aid in minimizing errors and correcting issues. The system and method composes and transforms the sensed information into an intuitive user interface. The primary action of selecting an individual subject is directly made easier through recommendations and contextual organization of information. A secondary action such as merging digital information (e.g., checkout lists) of two or more subjects is additionally made easier. For example, in a cashier application on a POS system, an operator could easily select the appropriate icons of users that the operator would like to merge into a single checkout transaction and then initiate the checkout process. The related action of splitting a checkout transaction is also maintained with similar user interface actions. For example, the operator if wanting to undo a merge or remove one or more subjects from a merged checkout transaction could similarly select the subjects to remove (or deselect subjects from the active subjects in the checkout transaction).

2. System

As shown in FIG. 1, a system for applying CV to a customer service application of a preferred embodiment can include a sensing system 100, which includes at least a CV monitoring system 110, and a subject management user interface (UI) 200. The sensing system 100 is configured to determine individual state of a plurality of subjects in an environment. In a variation used with a system for automated checkout, the individual state of a subject relates to a prediction of items selected by the subject that are intended for purchase within a retail environment. The CV monitoring is additionally configured to determine contextual organization of the subjects, which is used in presenting the UI of the subject management UI 200.

The sensing system 100 of a preferred embodiment is preferably configured to collect or determine at least some form of state information relating to a subject. The sensing system 100 can include one or more types of sensing systems. A sensing system 100 may collect data from the environment and then make a determination. One such sensing system 100 can include a CV monitoring system 110. Alternative and/or additional sensing systems could include smart cart/baskets, smart shelving, radar-based motion detection, wearable computer sensing systems (e.g., collecting data from inertial measurement units (IMUs) on phones and other activity sensing devices), and/or other suitable forms of sensing systems.

A sensing system 100 may additionally or alternatively receive digital communication from a device such that the sensing system 100 facilitates tracking of various forms of information of devices in the environment. Examples of such sensing systems could include near field communication system used to detect presence of a phone or other type of device, a radio frequency identifier tracking (RFID) system for tracking RF tags other RF identifiable objects, user applications that log information, and/or systems used to track and relay information from a computing device.

The sensing system 100 may operate in combination with one or more outside systems to facilitate rich forms of information modeling for subjects of the environment. One exemplary sensing system 100 is one used to facilitate some form of automated checkout. The sensing system 100 may therefore be configured to generate and track a checkout list for subjects in the store. As mentioned above, the sensing system 100 may additionally or alternatively be applied towards other forms of customer service. For example, subject profile information may be tracked such as product browsing history, which may be used by a salesperson when helping the subject. In another example, subject profile information can be used to enable a customer service representative to quickly access customer-submitted issues or questions when engaging with the customer within the environment.

The sensing system 100 preferably includes one or more computer processes and specially configured machine-readable instructions stored on a computer-readable medium. The machine-readable instructions are preferably specially configured so that execution and processing by the one or more processors, cause the sensing system 110 to detect subjects in the environment and establish an association between the detected subjects and at least one piece of data. More specifically for an automated checkout variation, the machine-readable instructions are preferably specially configured so that execution and processing by the one or more processors, cause the sensing system 110 to track a set of subjects through the environment and, for each subject, detect item interaction events, and update items in a checkout list based on the item interaction event. The item interaction events can include item section events and optionally item deselection events.

As for subject relationship modeling, the machine-readable instructions are preferably specially configured so that execution and processing by the one or more processors cause the sensing system 110 to detect a contextual organization of subjects relative to an operator station. This can include detecting subjects in proximity to an operator device (and/or an operator) and modeling line order, subject priority, subject and/or operator attention, and/or performing other operations to detect a contextual organization of subjects.

Preferably, the same sensing system 100 is used for subject data tracking and subject relationship modeling. However, in some variations, different sensing systems 100 may be used for subject data tracking and subject relationship modeling.

The sensing system 100 is preferably deployed in at least one location of the environment. In some variations, the sensing system 100 is deployed across a region of the environment and in some cases across a significant region of the environment. A significant region of the environment could be a region with substantial sensing coverage, which may include coverage percentages such as 10% coverage, 50% coverage, and/or 90% or more coverage.

A CV monitoring system 110 of a preferred embodiment functions to transform image data collected within the environment into observations relating in some way to subjects in the environment. Preferably, the CV monitoring system 110 is used for detecting items (e.g., products), monitoring users, tracking user-item interactions, and/or making other conclusions based on image and/or sensor data. The CV monitoring system 110 will preferably include various computing elements used in processing image data collected by an imaging system. In particular, the CV monitoring system 110 will preferably include an imaging system and a set of modeling processes and/or other processes to facilitate analysis of user actions, item state, and/or other properties of the environment. As mentioned the CV monitoring system 110 in one exemplary implementation is used to track a checkout list of subjects for offering automated checkout.

The CV monitoring system 110 preferably provides specific functionality that may be varied and customized for a variety of applications. In addition to item identification, the CV monitoring system 110 may additionally facilitate operations related to person identification, checkout list generation, item interaction tracking, store mapping, and/or other CV-based observations. Preferably, the CV monitoring system 110 can at least partially provide: person detection; person identification; person tracking; object detection; object classification; object tracking; gesture, event, or interaction detection; detection of a set of customer-item interactions, and/or forms of information.

In one preferred embodiment, the system can use a CV monitoring system 110 and processing system such as the one described in the published US Patent Application 2017/0323376 filed on May 9, 2017, which is hereby incorporated in its entirety by this reference. The CV monitoring system 110 will preferably include various computing elements used in processing image data collected by an imaging system.

The imaging system functions to collect image data within the environment. The imaging system preferably includes a set of image capture devices. The imaging system might collect some combination of visual, infrared, depth-based, lidar, radar, sonar, and/or other types of image data. The imaging system is preferably positioned at a range of distinct vantage points. However, in one variation, the imaging system may include only a single image capture device. In one example, a small environment may only require a single camera to monitor a shelf of purchasable items. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices). For example, in one implementation, the system could operate partially or entirely using personal imaging devices worn by users in the environment (e.g., workers or customers). In some variations, a mobile camera mounted to a worker can be used for generating a rendering a live or recent image of a line and making the people in the image selectable items of a user interface of an operator device.

The imaging system preferably includes a set of static image devices mounted with an aerial view from the ceiling or overhead. The aerial view imaging devices preferably provide image data that observes at least the users in locations where they would interact with items. Preferably, the image data includes images of the items and users (e.g., customers or workers). While the system (and method) are described herein as they would be used to perform CV as it relates to a particular item and/or user, the system and method can preferably perform such functionality in parallel across multiple users and multiple locations in the environment as shown in FIG. 2. Therefor, the image data may collect image data that captures multiple items with simultaneous overlapping events. The imaging system is preferably installed such that the image data covers the area of interest within the environment.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous across the monitored portion of the environment. However, discontinuities of a region may be supported. Additionally, monitoring may monitor with a substantially uniform data resolution or at least with a resolution above a set threshold. In some variations, a CV monitoring system 110 may have an imaging system with only partial coverage within the environment.

A CV-based processing engine and data pipeline preferably manages the collected image data and facilitates processing of the image data to establish various conclusions. The various CV-based processing modules are preferably used in generating user-item interaction events, a recorded history of user actions and behavior, and/or collecting other information within the environment. The data processing engine can reside local to the imaging system or capture devices and/or an environment. The data processing engine may alternatively operate remotely in part or whole in a cloud-based computing platform.

User-item interaction processing modules function to detect or classify scenarios of users interacting with an item. User-item interaction processing modules may be configured to detect particular interactions through other processing modules. For example, tracking the relative position of a user and item can be used to trigger events when a user is in proximity to an item but then starts to move away. Specialized user-item interaction processing modules may classify particular interactions such as detecting item grabbing or detecting item placement in a cart. User-item interaction detection may be used as one potential trigger for an item detection module.

A person detection and/or tracking module functions to detect people and track them through the environment.

A person identification module can be a similar module that may be used to uniquely identify a person. This can use biometric identification. Alternatively, the person identification module may use Bluetooth beaconing, computing device signature detection, computing device location tracking, and/or other techniques to facilitate the identification of a person. Identifying a person preferably enable customer history, settings, and preferences to be associated with a person. A person identification module may additionally be used in detecting an associated user record or account. In the case where a user record or account is associated or otherwise linked with an application instance or a communication endpoint (e.g., a messaging username or a phone number), then the system could communicate with the user through a personal communication channel (e.g., within an app or through text messages).

A gesture, event, or interaction detection modules function to detect various scenarios involving a customer. One preferred type of interaction detection could be a customer attention tracking module that functions to detect and interpret customer attention. This is preferably used to detect if, and optionally where, a customer directs attention. This can be used to detect if a customer glanced in the direction of an item or even if the item was specifically viewed.

The item detection module of a preferred embodiment, functions to detect and apply an identifier to an object. The item detection module preferably performs a combination of object detection, segmentation, classification, and/or identification. This is preferably used in identifying products or items displayed in a store. Preferably, a product can be classified and associated with a product SKU identifier. In some cases, a product may be classified as a general type of product. For example, a carton of milk may be labeled as milk without specifically identifying the SKU of that particular carton of milk. An object tracking module could similarly be used to track items through the store. Tracking of items may be used in determining item interactions of a user in the environment.

The item detection module in some variations may be integrated into a real-time inventory system. The real-time inventory system functions to detect or establish the location of inventory/products in the environment.

Alternative forms of CV-based processing modules may additionally be used such as customer sentiment analysis, clothing analysis, customer grouping detection (e.g., detecting families, couples, friends or other groups of customers that are visiting the store as a group), and/or the like. The system may include a number of subsystems that provide higher-level analysis of the image data and/or provide other environmental information such as a real-time virtual cart system.

The real-time virtual cart system functions to model the items currently selected for purchase by a customer. The real-time virtual cart system can manage the checkout lists of the various subjects (i.e., customers) in a retail environment. The virtual cart system may enable forms of automated checkout such as automatic self-checkout (e.g., functionality enabling a user to select items and walk out) or accelerated checkout (e.g., selected items can be automatically prepopulated in a POS system for faster checkout). Product transactions could even be reduced to per-item transactions (purchases or returns based on the selection or de-selection of an item for purchase). The virtual cart system may be integrated with the system to provide purchase or planned purchase information, which may be used as a condition for delivering content. The type of content delivered to customer may be based in part on their current cart contents. For example, a coupon may be selected and delivered to a customer for a particular brand of ketchup buns based in part on the customer having hamburger buns and ground beef in the cart.

The CV monitoring system 110 may additionally or alternatively include human-in-the-loop (HL) monitoring which functions to use human interpretation and processing of at least a portion of collected sensor data. Preferably, HL monitoring uses one or more workers to facilitate review and processing of collected image data. The image data could be partially processed and selectively presented to human processors for efficient processing and tracking/generation of a checkout list for users in the environment.

The CV monitoring system 110 can be used within the system for one or more modes of subject monitoring. One form of subject monitoring is a subject relationship modeling mode that functions to coordinate and direct how subject information can be presented in the subject management UI 200. The CV monitoring is preferably used in this mode to detect subjects and their contextual organization (e.g., from a position, orientation, and attention approach) relative to a worker and/or subject management user interface. For example, the CV monitoring system 110 is preferably used to approximate the priority or order in which subject icons should be presented in a cashier application when the subjects are lined up for checkout.

In a related mode of subject monitoring, the CV monitoring system 110 can be used in synchronizing subject information from some sensing system 100 (possibly also the CV monitoring system 110) with CV-detected subjects. This functions to associate collected state information with observed subjects.

An additional mode of subject monitoring could be one used for collecting subject state information as was described above such as the generation of a checkout list. However, the subject state information may alternatively be tracked and monitored through alternative types of sensing systems. In the automated checkout variation, this collected state information can include the checkout list. It could additionally include other information like user activity during a visit or during previous visits to a store, alerts associated with the user, and/or any suitable type of information.

The subject management UI of a preferred embodiment functions to facilitate some form of customer service as directed by a human operator. In facilitating, actions related to customer service, the subject management UI 200 preferably uses contextual organization status as detected by the CV monitoring system 110 to augment the presentation and interactions of the subject management UI 200.

The subject management UI 200 is preferably operable on a computing device. The computing device will preferably have a graphical user interface output but may alternatively or additionally have UI output in an audio format or other alternative medium of UI output. The subject management UI 200 is preferably implemented as an application or as part of a larger application, code-base, operating system, or other suitable type of software implemented solution.

The computing device can be a desktop or laptop computer, a tablet, smart phone, smart watch, smart glasses, smart headphones, augmented reality device, virtual reality device, and/or any suitable type of computing device, and/or any suitable type of computing device. The computing device could additionally be a POS system or some other purpose-built computing device. Multiple subject management UI 200 instances can be operating simultaneously within an environment. The implementation of the subject management UI 200 can vary depending on the type of computing device and the intended use case of the system. The location and presence of a subject management UI 200 may be registered or otherwise configured within the system. Alternatively the location and presence may be dynamically detected. The computing device of the subject management UI 200 may broadcast an identifying signal to the system. The sensing system 100 may alternatively detect and determine a location of the computing device. In some variations, the orientation of the computing device may be determined. In one variation, a visual marker can be placed on or near the location of the computing device such that that location can be used as a reference point for an associated computing device.

When used to assist in the checkout process, the subject management UI 200 is preferably part of a POS system. More specifically, the subject management UI 200 can be or be part of a cashier application operable on a tablet computer that is directly or communicatively coupled with a POS system. In this exemplary implementation, an operator (e.g., cashier) will have a tablet with a touch user interface that can present subject icons that can be used to determine who will be selected for a checkout transaction. The computing device of the subject management UI 200 may alternatively interface with a POS system and/or other additional systems. In another variation, the computing device ma be a POS processing system wherein checkout processing (e.g., price calculation, payment receipt, receipt generation, etc.) are handled by the computing device.

The subject management UI 200 will preferably include a number of views. The subject management UI 200 will preferably include a subject selection view, which is configured to present a set of subjects based on modeling of the context and relationship between the operator device and subjects in the environment. In one exemplary implementation, subjects are presented in an order intended to approximate the expected line order. This modeling of line order can factor in the detected physical proximity and order within a lineup region. The modeling may additionally consider the time of arrival to some region in the environment, the attention of the operator and/or subject, the orientation of an operator device, the subject data associated with the subjects, and/or other suitable factors.

The subject management UI 200 will then preferably facilitate accessing subject-related data. Accessing may include reading and displaying information based on the subject data. For example, the contents of a checkout list as determined by a CV monitoring system may be displayed in response to operator selection of a corresponding subject indicator. In another variation, data input received at the operator device may be added to subject data in response to selection of the subject. For example, an issue can be resolved for a checkout list of a real-time virtual cart system. In another example, an item may be added to a checkout list of a subject after selection of the appropriate subject in a subject management UI 200.

3. Method

As shown in FIG. 9, a method for applying CV to a customer service application of a preferred embodiment can include detecting interaction state data of a plurality of subjects in an environment S110; detecting a contextual organization of subjects relative to an operator station S120; and at a computing device of the operator station, augmenting a user interface based on the contextual organization of subjects S130. The subject-associated data of a subject is preferably accessible in the user interface. Augmenting the user interface S130 in one preferred variation can include presenting subject indicators in the user interface with the subject indicators arranged in response to contextual organization S132; and in response to user interaction with a subject indicator, accessing the digital interaction state data of a subject associated with the subject indicator S134.

More generally, the method may be applied in a similar manner to any suitable type of user-associated data. As shown in FIG. 10, the method can include detecting user-associated data of a plurality of subjects in an environment S210; detecting a contextual organization of subjects relative to an operator station S220; and at a computing device of the operator station, augmenting a user interface based on the contextual organization of subjects S230, which includes presenting subject indicators in the user interface with the subject indicators arranged in response to contextual organization S232, and, in response to user interaction with a subject indicator, accessing the user-associated data of a subject associated with the subject indicator S234. User-associated can be any suitable type of data that can be linked to a subject.

Specifically, the method may be used in presenting a menu of customer-associated icons (i.e., subject indicators) as selectable UI elements. The customer-associated icons can be presented in an order or manner based on the customers' organization around an operator station (or an operator). In a variation using a CV monitoring system, the customer-associated icons are presented based on interpretation of images capturing the organization around an operator station. For example, the order in which customers are waiting in line can be used to at least partially determine the order of the customer-associated icons. The customer-associated icons are used to access the customer information, which in this case could be information such as a checkout list information that could be automatically added to a POS system.

Method is primarily described as it is applied to one operator station and computing device. The method will generally be used in a computer environment and/or for a use case where multiple subject management user interfaces are used. When applied across an environment the method may alternatively be described as detecting digital interaction state data of a plurality of subjects in an environment S110; across a set of operator stations, detecting a contextual organization of subjects relative to each particular operator station S120; and at a computing device instance of each operator station, augmenting a user interface of the computing device instance based on the contextual organization of subjects detected for the associated operator station S130. Augmenting the user interface can similarly include presenting subject indicators in the user interface with the subject indicators arranged in response to contextual organization S132, and, in response to user interaction with a subject indicator, accessing the digital interaction state data of a subject associated with the subject indicator S134.

For example, the method is preferably usable across multiple customers in a retail environment, wherein each POS checkout station can apply the method in assisting a worker at that particular station. Each POS terminal of each checkout lane of a grocery store may be augmented through the method described here. Each individual computing device of a POS terminal may have an interface that intelligently presents subject indicators for the subjects waiting in that particular checkout lane as shown in FIG. 2.

In the case where its applied to automated checkout as shown in FIG. 11, the method could include tracking checkout list status of a plurality of shoppers S310; across a plurality of POS checkout stations, detecting a contextual organization of at least a subset of shoppers relative to each POS checkout station S320; and, at the POS checkout station, presenting shopper-associated UI elements in a UI of the POS checkout station, where the UI elements are organized by the contextual organization S332; and upon detecting selection of a shopper associated UI element, selecting a checkout list associated with the shopper for checkout processing S334. Multiple selections can be used to merge checkout lists of two or more shoppers. Alternatively, deselection of a UI element may remove a checkout list from checkout processing.

The method is preferably implemented through a system substantially similar to the one described above but may alternatively be implemented with any suitable system. The method is described primarily as it may be applied to a CV monitoring system for tracking checkout list information and then facilitating automated checkout through a POS system in a retail setting, but the method may additionally or alternatively be used for a variety of digital interactions offered in an environment shared by multiple subjects.

Block S110, which includes detecting digital interaction state of a plurality of subjects in an environment, functions to collect subject-associated information from a plurality of subjects in an environment. Detecting digital interaction state of a plurality of subjects is preferably implemented through remote sensing using at least one sensor-based monitoring system such as a CV monitoring system, sensor-enabled smart shelf system, smart carts, RF ID tracking system, other types of smart infrastructure, and/or additional sensor modalities.

The method is preferably applied to digital interactions that are individualized for a plurality of subjects. In the retail space, this may include tracking a checkout list of items selected for checkout while in the store, tracking browsing history of individual customers, receiving customer service request information form multiple customers in the store, and/or other suitable applications.

Through execution of block S110, at least some subjects in the environment will be associated with digital interaction state information. In many usage scenarios, multiple subjects will be detected and associated with digital interaction state information. The digital interaction state information can be dynamic and based on ongoing interactions within the environment. Alternatively, digital interaction state information could be state information detected through discrete, isolated events. For example, digital interaction state information may be generated when a subject enters the environment (or for any other type of event). In one exemplary variation, a user may perform some action like picking up a restricted item (e.g., alcohol) and this may be stored as interaction state data and used to indicate to a cashier which customers have picked up alcohol by labeling subject indicator icons with a graphical indicator, which may signal to the cashier that they should request ID.

As in the system described above, a variety of types of sensing systems may be used individually or in combination to collect the digital interaction state of a subject. Detecting digital interaction state preferably includes sensing the digital interaction state (and more generally activity) through one or more sensor-based monitoring systems. Sensing activity can include sensing activity across an environment, detecting subjects within the environment, and individually associating data with a set of subjects. The approach for sensing activity may vary depending on the type of digital interaction state monitored for the subjects. In a retail environment, item/product interactions may be monitored by sensing shelf activity through shelf-based sensors, detecting user-item interactions through CV analysis of image data (e.g., detecting item pickups and setdowns), and/or other techniques. Similarly, detecting user presence (which may be compared to item interactions for determining which user picked up an item for example) may include detecting user presence through one or more of computer vision, proximity detection, user and/or device location tracking (GPS, RF-based location tracking, wireless signal triangulation, etc.).

In variations of the method used with automated checkout, the digital interaction state can include checkout list data and detecting digital interaction state can include tracking a set of subjects through the environment; and for each subject, detecting item interaction events including at least item selection events and updating items in a checkout list based on the item interaction event. Detecting item interaction events including at least item selection events and updating items in a checkout list based on the item interaction event function to track the accumulation of items by individual subjects. The checkout lists are preferably associated with individual subjects, but may alternatively be associated with multiple subjects. This process for maintaining a checkout list in some preferred implementations using CV image processing wherein the method includes collecting image data and processing the image data through a CV image processing pipeline.

In some variations, the digital interaction state may occur outside of a sensing system 100 and could simply be information associated with a user record that can be synchronized with a subject in the record. In this variation, block S110 may include setting digital interaction state of a user record within a data management system.

The digital interaction state can be a complex information model like in the case of a checkout list. A checkout list may have an associated data model that specifies a list of items, prices or product codes associated with those items, exceptions or flags for the shopping experience or individual products (e.g., alcoholic drinks may be flagged for ID check, produce may be flagged for weighing). The approach for detecting item interaction events used to update a checkout list can depend on the type of sensor monitoring systems employed. In a CV variation, a CV monitoring system may be used in detecting items and detecting user-item interactions. In another example, a multi-sensor monitoring system may involve detecting item activity from a sensor-enabled shelf, detecting presence of a user near the location of the item activity through another sensor monitoring system (e.g., CV-based people tracking), and associating item activity with the user. In one variation, detecting user-item interactions can include using computer vision processing of image data and smart shelf event data. Other alternative approaches may similarly be applied to tracking of a checkout list.

As an alternative example, the digital interaction state could be as simple as binary state variable signifying if a user is requesting customer care assistance. In this way, a worker could view which customers in close proximity to them desire assistance. In a similar manner, any sort of data may be stored and associated with a user. Such information could be stored as customer profile data. The method could facilitate workers more quickly accessing information of a customer. Examples of types of customer profile data that could be useful for a worker to quickly access could include: a customer's service request, online orders being picked up in store, account status (e.g., type of account or membership status at a club, gym, bank, airport, etc.), activity history, and/or other types of customer information. The digital interaction state could be any suitable type of information, associated media files, and/or other suitable forms of digital information.

As discussed, a CV monitoring system is one preferred type of sensing system, and a CV monitoring system is preferably used at least in part for executing block S120. Accordingly, the method and more specifically can additionally include collecting image data, applying CV processing of the image data and generating digital interaction state resulting in part from the CV processing. In the variation of using the method with automated checkout, generating digital interaction state can include generating digital interaction state indicating the checkout list resulting in part from the computer vision processing.

Collecting image data in an environment, functions to collect video, pictures, or other imagery of a region containing objects of interest (e.g., inventory items). Image data is preferably collected from across the environment from a set of multiple imaging devices. Preferably, collecting image data occurs from a variety of capture points. The set of capture points include overlapping and/or non-overlapping views of monitored regions in an environment. Alternatively, the method may utilize a single imaging device, where the imaging device has sufficient view of the exercise station(s). The imaging data preferably substantially covers a continuous region. However, the method can accommodate for holes, gaps, or uninspected regions. In particular, the method may be robust for handling areas with an absence of image-based surveillance such as bathrooms, hallways, and the like.

The imaging data may be directly collected, and may be communicated to an appropriate processing system. The imaging data may be of a single format, but the imaging data may alternatively include a set of different imaging data formats. The imaging data can include high resolution video, low resolution video, photographs from distinct points in time, imaging data from a fixed point of view, imaging data from an actuating camera, visual spectrum imaging data, infrared imaging data, 3D depth sensing imaging data, parallax, lidar, radar, sonar, passive illumination, active illumination, and/or any suitable type of imaging data.

The method may be used with a variety of imaging systems, collecting imaging data may additionally include collecting imaging data from a set of imaging devices set in at least one of a set of configurations. The imaging device configurations can include: aerial capture configuration, shelf-directed capture configuration, movable configuration, and/or other types of imaging device configurations. Imaging devices mounted over-head are preferably in an aerial capture configuration and are preferably used as a main image data source. In some variations, imaging devices may include worn imaging devices such as a smart eyewear imaging device. This alternative movable configuration can be similarly used to extract information of the individual wearing the imaging device or other observed in the collected image data.

In applying CV processing and generating digital interaction state a variety of techniques may be used. In some instances, applying CV processing is used in detecting a user and establishing association with stored digital interaction state data, which may originate from user profile data. In a variation of the method used with automated checkout, an application of CV processing in detecting interaction state can include tracking a set of subjects through the environment; for each subject, detecting item interaction events, updating items in a checkout list based on the item interaction event (e.g., adding or removing items). The checkout list can be a predictive model of the items selected by a customer, and, in addition to the identity of the items, the checkout list may include a confidence level for the checkout list and/or individual items. The checkout list is preferably a data model of predicted or sensed interactions. Other variations of the method may have the checkout list be tracking of the number of items possessed by a customer or detection of only particular item types (e.g., controlled goods like alcohol, or automatic-checkout eligible goods). The CV monitoring system may use algorithmic approaches applying traditional computer vision techniques, deep learning models, machine learning, heuristic modeling, and/or other suitable techniques in processing the image data. The CV monitoring system may additionally use HL in evaluating image data in part or whole.

Alternative approaches may apply various forms of sensor fusion with CV or image-based monitoring systems.

Block S120, which includes detecting a contextual organization of subjects relative to an operator station, functions to analyze the setting in proximity to the operator station. Detecting the contextual organization of subjects preferably includes applying computer vision to interpreting relative position, orientation, attention and other properties of a subject in a region near the operator station. The contextual organization of subjects may predict or characterize the order of customers in a line (i.e., line order) as it would be relevant to a worker and operator of the operator station. The contextual organization of subjects preferably models from the point of view of the operator an appropriate and intuitive way of presenting subjects.

An output of detecting contextual organization of subjects can be a prioritized list of subjects ordered in some manner.

In one variation, all subjects in the environment may be analyzed. Alternatively, a subset of subjects may be analyzed. For example, subjects located in a predefined region may be analyzed. In one implementation, subjects within some threshold distance in proximity to an operator station are evaluated for contextual organization. Additionally or alternatively, up to a maximum number of subjects may be evaluated for contextual organization. These subjects will generally be those closest and in the correct direction or designated region. For example, the subjects close to an operator station but in the line for an adjacent operator station are preferably not considered and only the subjects in the line region for the operator station are evaluated.

A CV monitoring system is preferably used in evaluating the contextual organization of subjects relative to the operator station. Image data is preferably collected for each operator station and analyzed by detecting location of subjects and locations of operator stations. Additionally, CV processing of the image data may include detecting designated line regions, detecting direction of attention or body pose orientation of subjects and workers, direction/orientation of a computing device of the operator station, and/or other parameters. These various factors may be modeled to evaluate the contextual organization of the subjects.

The operator station could be defined by the physical device such as the POS system, the position of the operator (e.g., the worker), and/or a defined region in the environment. The method may include detecting presence of an operator station. Detecting presence of an operator station may include visually detecting the operator station through CV processing of the image data. A visual marker may be applied communicating an identifier of the operator station. In another variation, the location of the operator station can be configured within the CV monitoring system.

The contextual organization may be continuously updated, periodically updated, in response to an event like a change in image data, or as a result of any suitable trigger.

In one preferred approach, detecting contextual organization of subjects comprises detecting proximity of a subject to an operator station. Detecting proximity may include measuring position of the checkout station; for a set of subjects, detecting position; and measuring checkout station proximity. In some variations, the proximity could be an absolute magnitude measurement. In other variations, the proximity could be based on displacement in one or more dimensions. Various heuristics, filters, or machine learning processes may additionally be used to appropriate limit subjects of interest. For example, a subject filter could be used to ignore subjects lined up for an adjacent checkout station.

In a variation to detecting proximity, detecting contextual organization of subjects may include detecting line order which functions to analyze orientation and position patterns. Detecting line order may be specifically built around assessing order of subjects along a line. Detecting line order can include analyzing orientation and position of subjects relative to the operator station. Various heuristics, statistical models, machine learning models, and/or other techniques may be used to make such assessment useful.

Additionally or alternatively, detecting contextual organization of subjects can include detecting attention, which functions to interpret the attention of an operator and/or subjects. In one implementation, detecting body pose orientation of users through computer vision and then assigning attention metrics to subjects based on relative attention. For example, the operator detected to be facing a subject that facing the operator will have a high attention score. This may be used so that a list of customers can be presented based on whom a worker is facing. In some variations, the attention and orientation of an operator or an operator device may be used to determine aspects of a line. Accordingly, detecting line order can include detecting a direction of attention of one of the operator station or an operator. This may be used to determine the most likely first person in a line. In a grocery store, some subjects accompanying another subject may line up past the cashier and it will actually be the subject in position to pay that should be considered as the highest priority in the line. In another application, some situations may have a line form around a customer service representative with no defined lane for lining up as shown in FIG. 6. In this way, an organic line may form based on the dominant orientation of the customer service representative. Detecting this dominant orientation may be used in classifying and assigning a line order to subjects in near proximity.

In a related variation, detecting contextual organization of subjects may include detecting mutual attention of an operator and at least one subject, which functions to assign priority based in part on shared attention between an operator and one or more subjects. For example, a customer and a cashier looking at each other (or at least directing attention towards each other) can prioritize that subject relative to other subjects.

In another variation, subjects may be classified visually as being in a waiting state (i.e., a queuing state). A subject that is near an operator station but is walking away or participating in shopping activity may be determined to not be in a waiting state and may be excluded from a prioritized list of subjects.

In another variation, detecting contextual organization of subjects may include detecting social grouping of subjects, which functions to determine if and which subjects may be part of a group. This may additionally include associating multiple subjects with a single checkout list. Associating multiple subjects with a single checkout list can include merging checkout lists from multiple subjects of a group. In another variation, associating multiple subjects with a single checkout list can include associating subjects to one indicated checkout list. This can be used to group families and groups of friends. Detecting social grouping can include detecting a social association of two or more subjects from historical interactions in the environment. Accordingly, how two or more subjects interact in the environment can lead the monitoring system to determine they are some form of pairing. In the case where one subject is detected as a child and the other as an adult, then the child and adult may be paired for checkout. In the case of two adults, where it can be difficult to know if the adults will want separate or shared checkouts, the contextual organization may reflect their pairing but not default to associating the subjects directly.

The contextual organization may additionally depend on analysis and information that originates from image data when the subject is not near the operator station and is instead determined based on previous interactions in the environment. Detecting a social grouping could be achieved by detecting shared paths, sustained proximity, detecting interactions, detecting sharing of a cart, detecting one or more instances of communication (e.g., directed visual attention, directed speech, physical contact, etc.), and/or making other suitable observations. In one implementation, social grouping may alternatively be based on information from a digital platform such as a social network or any suitable source. For example, a subject may preregister or link their account with the accounts of their family members.

As another variation, the contextual organization may factor in digital interaction state information. For example, contextual organization may consider information of a checkout list like indication of exceptions, no items, needs weight check, and the like.

In one implementation, machine learning model may be trained using a training set mapping a number of relevant contextual features can be detected and resulting user interface interactions. This training may be used to adapt to different environmental conditions. Different stores have different checkout line organizations, machine learning applied to improving prioritization of subject position can be used adapt to the various environments.

As part of S120 or as an additional step the method can include establishing an association of a CV-detected person (a subject) with digital interaction state information. In some implementations, association is established between CV-detected person and a user record, and the digital interaction state information is data linked to the user record. Establishing an association can be facilitated through the CV monitoring system or other techniques such as those described in U.S. patent application Ser. No. 16/015,180, filed on 21 Jun. 2018, which is hereby incorporated in its entirety by this reference.

Block S130, which includes augmenting a user interface at a computing device of the operator station based on the contextual organization of subjects, functions to customize presentation or interactions of an application. The user interface is preferably augmented to present subject related information in a manner that is relevant to the perspective of the operator. In the automated checkout use case, the computing device can be a POS system, and augmenting a user interface can be used to provide a contextually aware menu from which a cashier can select one or more subjects for checkout. This can enable a cashier to better interact and facilitate automated forms of checkout. More generally, block S130 can be used to enable an operator to be presented with a menu of possible subjects, where the subjects are organized based on the contextual organization (e.g., proximity, line order, who the operator is facing) and the like.

In one preferred variation, block S130 can include presenting subject indicators in the user interface with the subject indicators arranged in response to contextual organization S132; and in response to user interaction with a subject indicator, accessing the digital interaction state data of a subject associated with the subject indicator S134. Selecting a subject indicator by an operator may be used to access a user interface view with more detailed information or to select that subject to perform some additional action. Accessing the digital interaction state data may include reading the digital interaction state data and/or writing to the digital interaction state data. In some variations, the digital interaction state data may in part be presented or used in determining the user interface prior to any user interaction. For example, checkout list contents may be displayed in part next to the subject indicators prior to any selection of a subject.

Block S132, which includes presenting subject indicators in the user interface with the subject indicators arranged in response to contextual organization, functions to display subject indicators in a manner that corresponds to the operator's perspective. The contextual organization preferably considers physical conditions of the environment (e.g., relative positions of subjects, the operator, and other items in the environment) as well as the objectives of the operator (e.g., to checkout shoppers in a line).

A subject indicator is preferably a graphical representation of a subject. In one variation that may be a graphical icon that could show an image of the subject. The method in some implementations may include capturing an image of subjects while in the environment and using the image in the graphical representation. A dedicated image capture device may be used to capture images of the subjects' faces. In another variation, a user profile image of a subject could be used. Other variations may include using other symbolic representations such as clothing indication (e.g., showing a red shirt), indicating items from cart, or providing other descriptors that could be used to identify a subject.

Along with the subject indicators the subject management UI can additionally present other information such as digital interaction state information. For automated checkout, the subject indicators may be marked with indication of errors, cart exceptions, number of items in cart, tasks for the worker such as weighing produce, and/or other suitable information.

The user interface preferably presents a set of subject options (i.e., subject indicators). This could be presented as a list view, a gallery, explorable cards, or other suitable interfaces. In general, the graphical representations of subjects are selectable. In some variations, multiple subjects are selectable. Once selected, one or more actions may be executed on behalf of the subjects. An executed action will preferably use the digital interaction state of the subject. In the case of automated checkout, the checkout list(s) of the selected subject(s) are entered into the POS system for checkout processing. The order of the subject options is preferably based on the contextual organization information from S120. Accordingly, presenting a set of subject indicators in the user interface with the subject indicators arranged in response to contextual organization can include ordering the subject indicators in an order corresponding to the line order. For example, subject indicators are preferably presented in an order that reflects a real world line. Order may a sequential order, but in a user interface, order may determine priority within the user interface. User interface arrangements based on order can determine placement, sequential order, size of the UI element, visibility (which subject indicators to show and when), page order, graphical presentation (e.g., how the subject indicator is presented in terms of the information included, etc.), and/or other variables of a user interface.

In the variation, where a group of subjects are grouped, presenting subject indicators may include representing a group of subjects as a single subject indicator or a grouping of subject indicators, which functions to present subjects by social grouping. Interactions can be applied across the group. This social grouping in some cases override the real world line such as for grouping a child with an adult subject in the user interface. Attention of the subjects and/or operator may similarly alter organization. In some variations, the digital interaction state data of each subject member of the group may be combined into one digital interaction state for the group. For example, the individual checkout lists of multiple customers can be combined into a single group checkout list. Alternatively, access to the digital interaction state in block S134 may involve performing some action (e.g., updating data) to each of the individual digital interaction state data of each group member.

In general, presenting a subject indicator within the user interface includes enabling user selection of the subject indicator from the user interface. For example, a user may be able to select a subject indicator to indicate they want to perform a checkout operation for them. Additionally or alternatively a set of interactive items may be performed in connection to the subject indicator. For example, sub-menu could be presented in connection to a subject indicator allowing an operator to perform various actions like select the option to add an item. Various user interface approaches may be used.

In some variations, groups of subjects may be manually created by an operator, which can include receiving user input indicating an associated group of subjects, and in response to indication of an associated group of subjects, grouping the subject indicators. This may additionally include merging the digital interaction data of the subjects.

Selecting a subject in the user interface will generally depend on device input such as touch input on a tablet-like device or mouse/keyboard input on a computer. Selecting a subject could additionally use contextual organization. For example, the directed attention of an operator may be used to automatically select a subject based on whom the operator is facing, looking at, or indicating (e.g., pointing at).

The user interface may be updated in real-time, but, in some implementations, the order and presentation of the subjects may lock to avoid UI elements moving/changing as an operator attempts to interact with them. For example, a refresh button may be provided in the UI to allow an operator to explicitly indicate when the presentation of the subjects should be refreshed. In some variations, a UI indicator could be presented to signify when the system believes the UI is "out of date" and should be refreshed.

Figure 7:
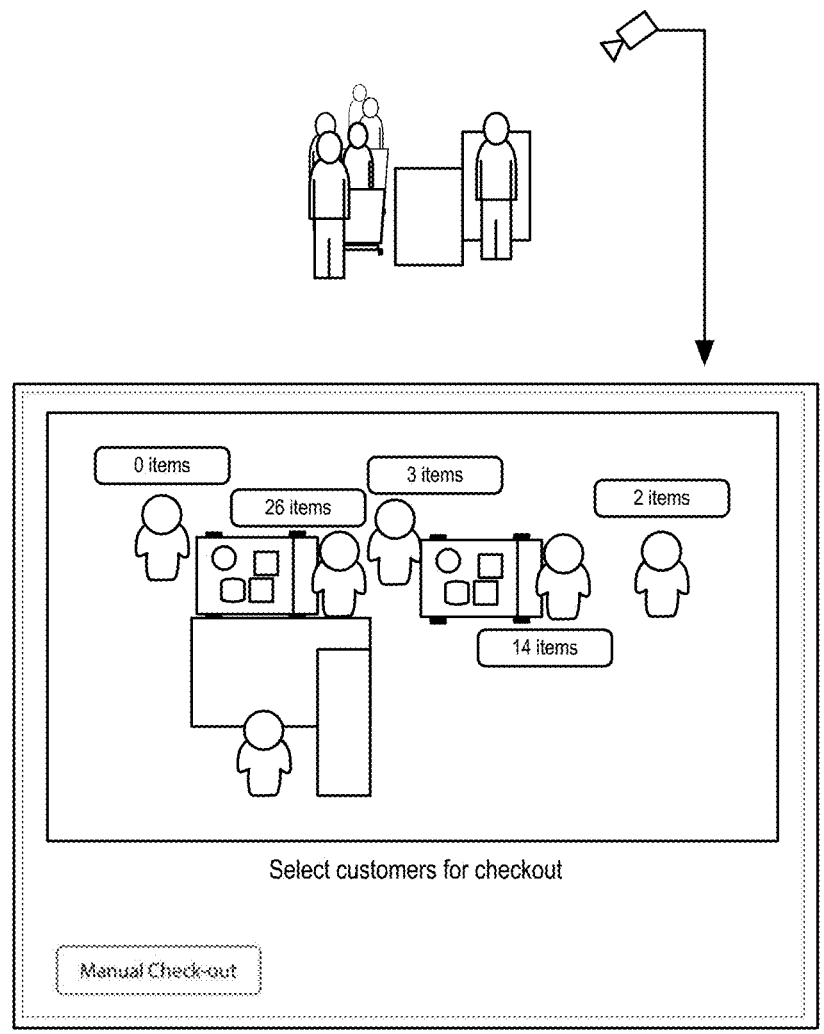
FIG. 7 is an exemplary screenshot of a subject management user interface using an image-based representation.

In one alternative variation, a user interface presents an image-based representation of the scenario, which functions to use an image map as a user interface as shown in FIG. 7. In this variation, presenting subject indicators in the user interface can include generating an interactive image-based representation and presenting the image-based representation with selectable subject indicators at the location of the subjects represented in the image-based representation. The image-based representation is preferably an image-based representation of the position of subjects relative to the operator station. The image-based representation preferably allows visual selection of a subject. For example, a cashier can be presented with an image showing the customers waiting in line. The cashier can select a customer for checkout by selecting the customer shown within the image. Generating an interactive image-based representation may include determining position of CV detected subjects in collected image data, presenting the interactive image-based representation with interactive subject indicator UI elements corresponding to a CV detected subject at the position of each relevant CV detected subject.

Figure 8A:
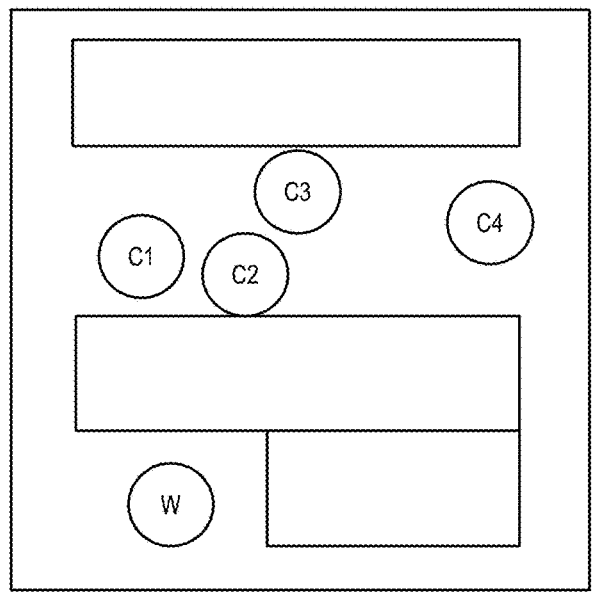
FIGS. 8A-8C are exemplary variations of types of image-based representations.
Figure 8B:
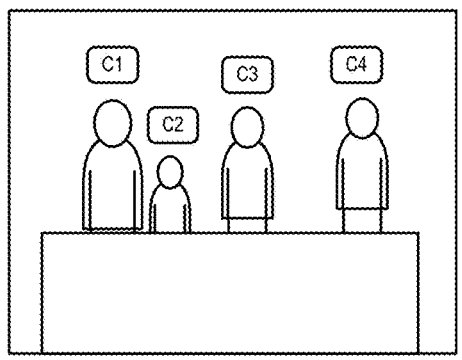

In one variation, the image-based representation could be a synthesized representation. For example, the synthesized representation could be an overhead graphical map showing the operator station and visual indication of the subjects in corresponding location as shown in FIG. 8A. This variation functions to create a graphical map with representative indicators of subject position relative to the operator. In another variation, the image-based representation could be a still or live video stream from an image capture device as shown in FIG. 8B. The image capture device is preferably oriented to have a similar perspective as the operator (e.g., from behind the POS system). In this variation, the method may include collecting live video and detecting user selection at a location of CV detected person within the presented image.

Figure 8C:
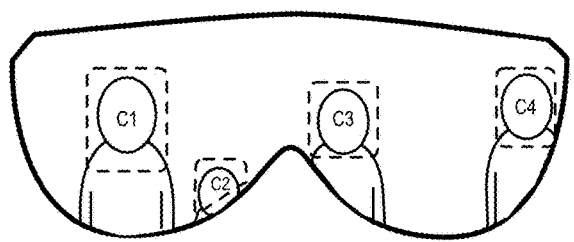

From that image-based representation, the operator can select a subject. The contextual organization of subjects in one variation can be used in generating an interactive image-based representation such as by generating the synthesized representation or adding interactive elements to an image or video. In some alternative variations, the image-based representation variation may be implemented without block S120. Locating and marking of subjects in the appropriate image data may defer interpretation of the line order of the subjects to the operator, and instead the image-based representation of nearby subjects serves as a spatial map of nearby subjects. The image-based representation could be extended to augmented reality or virtual reality user interfaces. In an augmented reality variation, wherein presenting the image-based representation can include rendering the image-based representation in an augmented reality display as shown in FIG. 8C. In this way subject indicators may be overlaid or displayed in positions associated with viewed subjects.

Block S134, which includes accessing the digital interaction state data of a subject associated with the subject indicator in response to user interaction with a subject indicator, functions to perform an action in connection with the digital interaction state data of the subject.

Accessing the digital interaction state data may include reading and updating the user interface with content based on the digital interaction state data. For example, after selecting a subject indicator, the checkout list of the subject associated with the subject indicator may be displayed. In this variation accessing the digital interaction state data may include communicating the digital interaction state data to the computing device of the operator station. The data will generally be stored in a remote data storage system and managed by the monitoring system.

In the method variation used with an automated checkout, accessing the checkout list of the subject further can include presenting a representation of the checkout list within the user interface. In this variation accessing the digital interaction state data may include communicating the digital interaction state data to the computing device of the operator station. The data will generally be stored in a remote data storage system and managed by the monitoring system Reading of interactive state data may not be used solely for presenting information but also performing some actions such as completing a checkout transaction. In some variations, accessing the checkout list of the subject can include executing a checkout process for items of the checkout list, which functions to enter the items of the checkout list for POS processing, receiving payment, and finalizing the checkout process.

In a related variation, accessing the checkout list of the subject further can include, if a cart issue is associated with the checkout list, presenting a guided resolution interaction flow within the user interface to resolve the cart issue prior to executing the checkout process. Cart issues may include conditions with the checkout list related to an unidentified item, an unknown number of items, produce or by-weight items requiring weighing, restricted items needing ID or other forms of verification, and/or other issues. The resolution interaction flows preferably indicate the cart issue and supplies a user interface for resolving—typically by receiving operator input.

For example, produce items will commonly be sold by weight and so for each produce item, an item exception may be flagged for the produce item in the checkout list of a subject. The operator can be guided through a process of pairing produce identifiers, such as Price Look Up (PLU) codes, with measured item weight. In some implementations and instances, the CV monitoring system may automatically supply the PLU code when detecting the item being weighed during the resolution workflow. In other instances, the operator may enter the PLU code. By collecting the weight at the operator station and the PLU (through automated entry by the monitoring system or manual entry) the item exception can be resolved and the item correctly updated in the checkout list.

In another example, the quantity of an item may not be accurately detected by the monitoring system, and as such a cart issue will be flagged in association with that item of the checkout list. During checkout processing of the checkout list, a resolution interaction flow can trigger: at the user interface displaying an item count resolution view, receiving item count and updating the count of the associated item in the checkout list. The item count resolution view may display a request like "How many of this item did the customer select?" and then the operator can visually count and enter the correct number. The item in the checkout list can be appropriately updated with the verified item count.

A more detailed description of the checkout process performed at the computing device can include: presenting the subject indicators in an arrangement based on line order, receiving operator selection of a subject indicator, accessing the checkout list of a subject associated with the subject indicator, optionally displaying the contents of the content list, if a cart issue is associated with the checkout list, presenting a guided resolution interaction flow within the user interface to resolve the cart issue, and receiving confirmation to proceed with checkout once a checkout list is valid, entering the items into a POS processing system, determining a checkout total, receiving payment, and finalizing the checkout process. In some variations, the method may only involve supplying the item information of the checkout list to an external POS processing system that finalizes the checkout process. Alternatively, the method may include performing each step of checkout processing.

Accessing the digital interaction state data may additionally or alternatively include updating the subject indicator state data, which functions to write or edit the subject indicator state data. For example, issues and problems with a checkout list may be manually resolved by an operator and resolution input data can be used in updating the checkout list. In this variation, accessing the checkout list of the subject can include adding or updating at least one item to the checkout list of the select subject based on received user interaction at the operator station.

Figure 5:
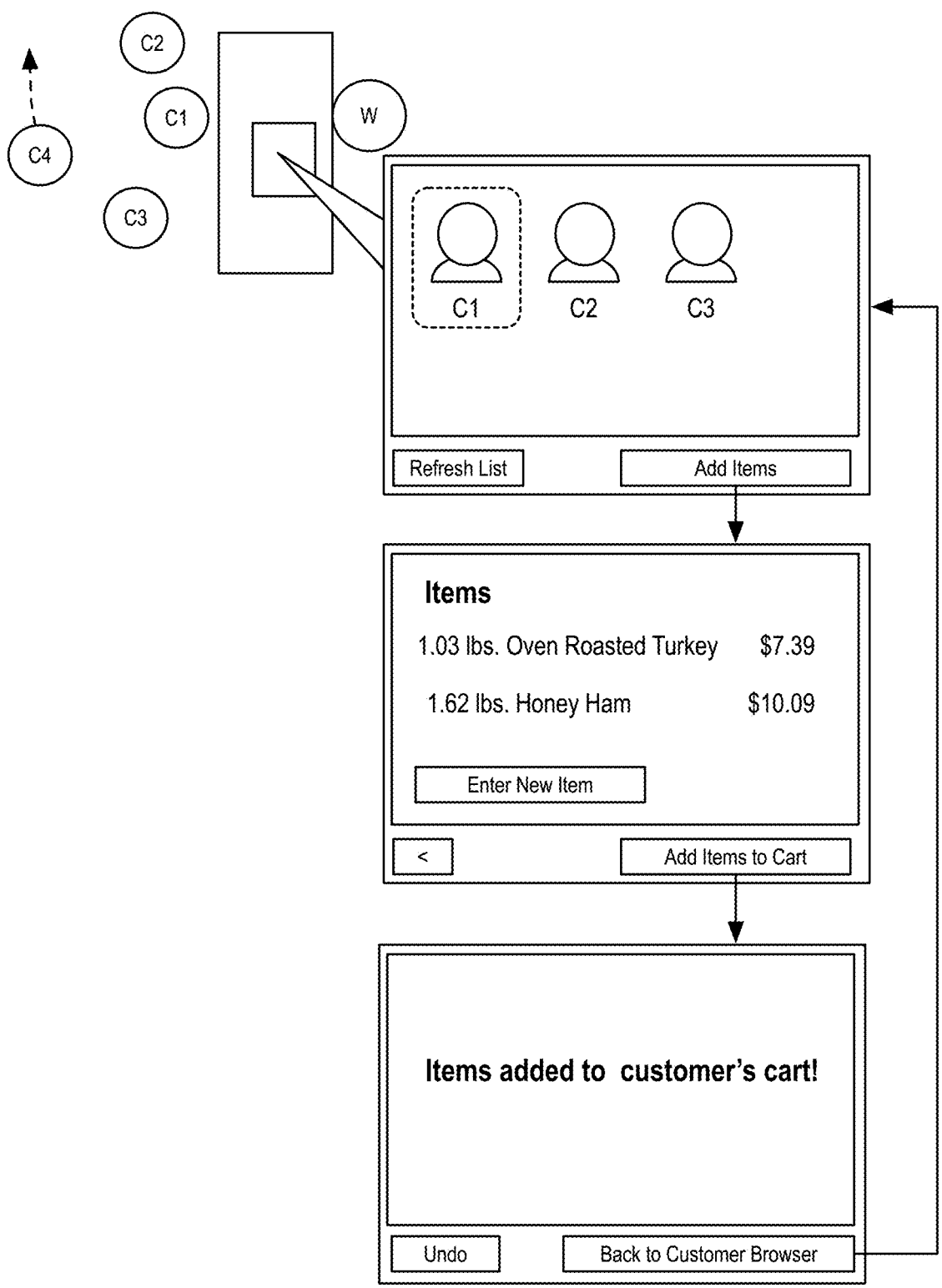
FIG. 5 is a schematic representation of an exemplary scenario for adding items at a service counter.

In one particular scenario, the method may be used to add items to a checkout list of a customer. This can have particular utility at service counters of a grocery store like at the deli, fish, butcher, and/or bakery counter where service counter items are individually prepared and priced. In this scenario, when an operator prepares an item and wants to add it to the checkout list of the customer, the method can include, presenting the subject indicators in an arrangement based on most likely subjects being served by the operator, receiving operator selection of a subject indicator, entering the item information (e.g., price, item description, etc.), receiving operator confirmation to add to the checkout list, communicating the information to a computer-implemented system managing the checkout list, and adding the item information to the checkout list of the selected customer as shown in FIG. 5. This variation of the method serves to make the process of an operator updating digital information of a customer easier since they can more easily access their information. This checkout list may later be processed in any suitable manner.

The method and the variations described in any suitable combination and applied to the applications described herein as well as other applications that could benefit from a dynamic user interface used to facilitate linking presence of real users with associated virtual data.

As described one preferred implementation of the method includes: detecting digital interaction state of a plurality of subjects in an environment using at least one sensor-based monitoring system; detecting a contextual organization of subjects relative to an operator station; at the operator station, augmenting the user interface based on the contextual organization of subjects which comprises of at least: presenting a set of subject indicators in the user interface with the subject indicators arranged in response to contextual organization, and in response to received user interaction with at least one selected subject indicator, accessing the digital interaction state of the subject associated the at least one subject indicator. Below are some detailed descriptions of some preferred variations. However, such variations may be combined in any suitable manner and used in combination with any suitable variation described herein.

In a virtual cart related variation of the above implementation, detecting digital interaction state may include tracking a set of subjects through the environment and, for each subject, detecting item interaction events including at least item selection events and updating items in a checkout list based on the item interaction event; and wherein accessing the digital interaction state of the subject comprises accessing the checkout list of the subject an associated with the at least one subject indicator.

In a checkout variation of the virtual cart related variation, accessing the checkout list of the subject can include executing a checkout process for items of the checkout list. This may include transmitting the checkout list to a checkout list processor (e.g., a POS processing system). This may alternatively include performing the checkout process and executing a transaction on behalf of the checkout list.

In the checkout variation above, accessing the checkout list of the subject may include presenting a representation of the checkout list within the user interface. This can include identifying and communicating the checkout list to the computer device of the operator device. Presentation of the checkout list may happen after selection of the associated subject in the user interface.

In the checkout variation above, accessing the checkout list of the subject further comprises, if a cart issue is associated with the checkout list, presenting a guided resolution interaction flow within the user interface to resolve the cart issue prior to executing the checkout process. The cart issue could be detection of a by-weight item (e.g., a produce item), and the guided resolution interaction flow can be used in collecting item weight and pairing with product identifier (e.g., a PLU code) and updating the checkout list. The cart issue could include detection of an unknown item count, and the guided resolution interaction flow can be used in collecting an item count for one or more item and updating the checkout list. The cart issue could alternatively include detection of an unknown item type, and the guided resolution interaction flow can be used in specifying a description of the item and requesting product identification. For example, it may announce an unknown cereal box (optionally with additionally identifying characteristics) and the operator can resolve the issue by scanning the cereal box or asking the customer for the product identity. The cart issue could include a restricted item alert, and the guided resolution interaction flow could instruct the operator to verify ID for a list of restricted items, and once ID is confirmed, checkout can proceed. Other cart issue types could similarly be used.

In the checkout variation above, detecting contextual organization of subjects may include detecting social grouping of subjects and associating multiple subjects with a single checkout list. Grouping may be performed using various numbers of factors from the sensor monitoring system or from other data sources. Some variations may enable options for manual control of merging within the user interface.

In the virtual cart variation above, accessing the checkout list of the subject can include adding at least one item to the checkout list of the subject based on received user interaction at the operator station. This can be used to add service counter items; and could additionally be used in other situations. As more general variation, accessing the digital interaction data can include modifying the digital interaction data based on received user interaction at the operator station.

In the virtual cart variation above, detecting item interaction events can involve the use of a CV monitoring system and can include collecting image data, applying computer vision processing of the image data and detecting item interaction events in part from the computer vision processing. The CV monitoring system can additionally be used in collecting image data of the region in proximity to the operator station and detecting a contextual organization of subjects relative to an operator station can include analyzing the image data of the region in proximity to the operator station using CV processing and at least partially determining contextual organization. In one implementation this may include supplying the image data in a convolutional neural network or other suitable ML, neural network, deep learning, statistical, heuristical, or other type of model that outputs indication of appropriate subjects and preferably prioritizes the identified subjects by predicted line order. This may similarly be applied in the method more generally.

In the virtual cart variation above, detecting item interaction events can include detecting user-item interactions using computer vision processing of image data and a smart shelf event data. This is one example of combining multiple types of sensor-based monitoring systems. Any suitable combination of CV monitoring smart carts, RFID tracking, smart shelves, smart infrastructure and/or other monitoring systems may be used.

In variation of the method above, wherein detecting contextual organization comprises detecting line order by analyzing orientation and position of subjects relative to the operator station.

In the line order variation above, detecting line order further may include detecting a direction of attention of one of the operator station or an operator.

In the line order variation above, presenting a set of subject indicators in the user interface with the subject indicators arranged in response to contextual organization can include ordering the subject indicators in an order corresponding to the line order.

In a variation of the method above, presenting a set of subject indicators in the user interface can include generating an interactive image-based representation of the position of subjects relative to the operator station and presenting the image-based representation with selectable subject indicators at the location of the subjects represented in the image-based representation. In a related variation, presenting the image-based representation comprises rendering the image-based representation in an augmented reality display. The image-based representation may alternatively be a synthesized graphical representation or an annotated image captured of the operator station.

Other suitable variations and variation combinations may additionally be implemented, and the method is not limited to only this variation and implementations.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: detecting user-associated data of a plurality of subjects in an environment; detecting a contextual organization of subjects relative to an operator station; and at a computing device of the operator station, augmenting a user interface based on the contextual organization of subjects, which includes presenting subject indicators in the user interface with the subject indicators arranged in response to contextual organization, and, in response to user interaction with a subject indicator, accessing the user-associated data of a subject associated with the subject indicator.

Figure 12:
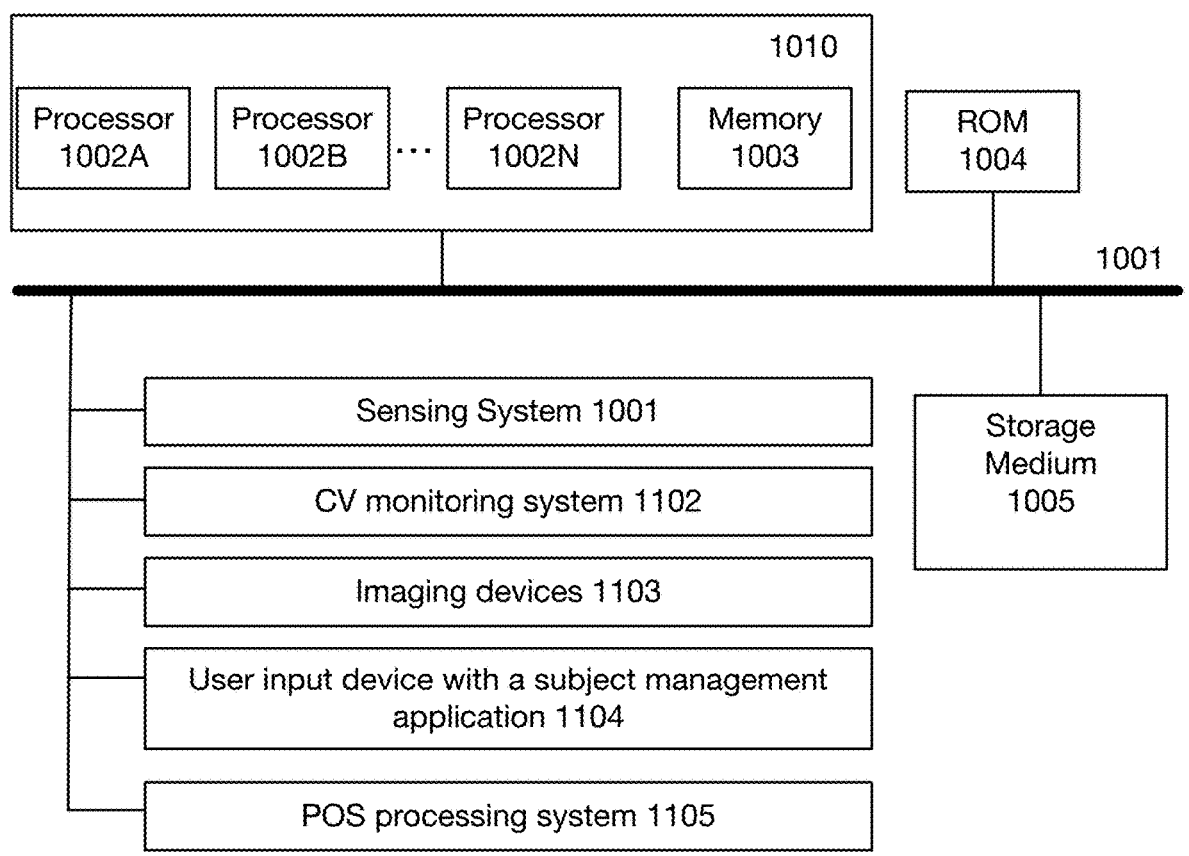
FIG. 12 is an exemplary system architecture that may be used in implementing the system and/or method.

FIG. 12 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting sensing system 1101, CV monitoring system 1102, imaging devices 1103, User input device with a subject management application 1104, POS processing systems 1105, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:
1. A method comprising:
at a sensing system including a computer vision monitoring system with imaging devices installed within an environment, detecting a digital interaction state for each subject of a set of subjects in the environment, wherein detecting the digital interaction state comprises tracking the set of subjects through the environment, and for each subject of the set of subjects detecting user-item interaction events and updating a checkout list of each subject of the set of subjects with items based on the user-item interaction events;
at the sensing system, detecting a contextual organization of the set of subjects relative to an operator station, comprising detecting a line order by analyzing orientation and position of each subject of the set of subjects relative to the operator station;
at the operator station, augmenting a user interface based on the contextual organization of the set of subjects which comprises at least: presenting a set of subject indicators in the user interface with the set of subject indicators arranged in response to the contextual organization of the set of subjects, and
in response to a received user interaction with at least one selected subject indicator from the set of subject indicators, accessing the digital interaction state of a subject associated with the at least one selected subject indicator comprising accessing the checkout list of the subject associated with the at least one selected subject indicator, and wherein accessing the checkout list of the subject comprises:
detecting a cart issue associated with the checkout list;
presenting a guided resolution interaction flow within the user interface to resolve the cart issue; and
executing a checkout process for items of the checkout list.
2. The method of claim 1, wherein accessing the checkout list of the subject further comprises presenting a representation of the checkout list within the user interface.
3. The claim 1, wherein detecting the contextual organization of the set of subjects may include detecting a social grouping of the set of subjects and associating multiple subjects from the set of subjects with a single checkout list.

4. The method of claim 1, wherein accessing the checkout list of the subject comprises adding at least one item to the checkout list of the subject based on the received user interaction at the operator station.

5. The method of claim 1, wherein detecting the item interaction events comprises collecting image data, applying computer vision processing of the image data and detecting the item interaction events in part from the computer vision processing.

6. The method of claim 1, wherein detecting item the interaction events comprises detecting user-item interactions using computer vision processing of image data and a smart shelf event data.

7. The method of claim 1, wherein detecting the line order further comprises detecting a direction of attention of one of the operator station or an operator.

8. The method of claim 1, wherein presenting the set of subject indicators in the user interface with the set of subject indicators arranged in response to the contextual organization of the set of subjects comprises ordering the set of subject indicators in an order corresponding to the line order.

9. The method of claim 1, wherein the set of subject indicators are a set of selectable subject indicators; and wherein presenting the set of subject indicators in the user interface comprises generating an interactive image-based representation of the position of each subject of the set of subjects relative to the operator station and presenting the interactive image-based representation with the set of selectable subject indicators positioned at locations corresponding to at least a subset of subjects of the set of subjects, the set of selectable subject indicators being represented in the interactive image-based representation.

10. The method of claim 9, wherein presenting the interactive image-based representation comprises rendering the interactive image-based representation in an augmented reality display.

11. A system comprising:
 a sensor-based monitoring system comprising at least a computer vision monitoring system with a set of imaging devices installed with an environment;
 a computing device at an operator station, the computing device operating a subject management user interface; and
 one or more computer-readable mediums in communication with the sensor-based monitoring system and computing device, the one or more computer readable mediums storing instructions that, when executed by one or more computer processors, cause the one or more computer processors to perform operations comprising:
 detecting user-associated data of a set of subjects in an environment, which comprises tracking the set of subjects through the environment, and for each subject of the set of subjects detecting user-item interaction events and updating a checkout list of each subject of the set of subjects with items based on the user-item interaction events,
 detecting a contextual organization of the set of subjects relative to the operator station, comprising detecting a line order by analyzing orientation and position of each subject of the set of subjects relative to the operator station, and
 at the computing device, augmenting the subject management user interface based on the contextual organization of the set of subjects, which includes presenting a set of subject indicators in the subject management user interface with the set of subject indicators arranged in response to the contextual organization of the set of subjects, and, in response to a user interaction with at least one selected subject indicator from the set of subject indicators, accessing the user-associated data of a subject associated with the at least one selected subject indicator comprising accessing the checkout list of the subject associated with the at least one selected subject indicator, and wherein accessing the checkout list of the subject comprises:
 if a cart issue is associated with the checkout list, presenting a guided resolution interaction flow within the user interface to resolve the cart issue prior to executing a checkout process; and
 executing the checkout process for items of the checkout list.

12. The system of claim 11, wherein detecting the item interaction events comprises collecting image data, applying computer vision processing of the image data and detecting item interaction events in part from the computer vision processing.

13. The system of claim 11, wherein detecting the item interaction events comprises detecting user-item interactions using computer vision processing of image data and a smart shelf event data.

* * * * *